United States Patent
Liu et al.

(10) Patent No.: US 10,924,670 B2
(45) Date of Patent: Feb. 16, 2021

(54) SYSTEM AND APPARATUS FOR CO-REGISTRATION AND CORRELATION BETWEEN MULTI-MODAL IMAGERY AND METHOD FOR SAME

(71) Applicants: Yang Liu, Copley, OH (US); Maziyar Askari Karchegani, Akron, OH (US)

(72) Inventors: Yang Liu, Copley, OH (US); Maziyar Askari Karchegani, Akron, OH (US)

( * ) Notice: Subject to any disclaimer, the term of this patent is extended or adjusted under 35 U.S.C. 154(b) by 33 days.

(21) Appl. No.: 15/952,909

(22) Filed: Apr. 13, 2018

(65) Prior Publication Data
US 2018/0302564 A1 Oct. 18, 2018

Related U.S. Application Data

(60) Provisional application No. 62/485,583, filed on Apr. 14, 2017.

(51) Int. Cl.
*H04N 5/232* (2006.01)
*G06T 7/33* (2017.01)
(Continued)

(52) U.S. Cl.
CPC .......... *H04N 5/23245* (2013.01); *G06T 7/33* (2017.01); *G06T 7/38* (2017.01); *G06T 7/593* (2017.01);
(Continued)

(58) Field of Classification Search
CPC ............. H04N 5/23245; H04N 13/246; H04N 13/271; H04N 13/25; H04N 5/2256;
(Continued)

(56) References Cited

U.S. PATENT DOCUMENTS 6,400,835 B1 6/2002 Lemelson et al.
7,139,738 B2 11/2006 Philomin et al.
(Continued)

FOREIGN PATENT DOCUMENTS

KR 1020140106221 A 9/2014
WO 2006036398 A2 4/2006
(Continued)

OTHER PUBLICATIONS

Notification of Transmittal of the International Search Report and the Written Opinion of the International Searching Authority, or the Declaration in related application No. PCT/US2018/027539; dated Jul. 31, 2018; 2 pages.
(Continued)

*Primary Examiner* — Jason A Flohre
*Assistant Examiner* — Zhenzhen Wu
(74) *Attorney, Agent, or Firm* — Taft Stettinius & Hollister LLP

(57) ABSTRACT

The present disclosure provides an image capturing device that captures images of a first sensor that includes a first imaging modality, a second sensor that includes a first imaging modality and a third sensor that includes a second imaging modality. A controller connected with the first sensor, the second sensor and the third sensor, wherein the controller registers an image captured by the first sensor or the second sensor to an image captured by the third sensor.

47 Claims, 16 Drawing Sheets

(51) Int. Cl.
| | |
|---|---|
| *H04N 13/25* | (2018.01) |
| *H04N 5/225* | (2006.01) |
| *H04N 13/246* | (2018.01) |
| *H04N 17/00* | (2006.01) |
| *H04N 13/271* | (2018.01) |
| *G06T 7/38* | (2017.01) |
| *H04N 5/33* | (2006.01) |
| *H04N 5/235* | (2006.01) |
| *G06T 7/593* | (2017.01) |

(52) U.S. Cl.
CPC ......... *H04N 5/2256* (2013.01); *H04N 5/2258* (2013.01); *H04N 5/2354* (2013.01); *H04N 5/23203* (2013.01); *H04N 5/332* (2013.01); *H04N 13/246* (2018.05); *H04N 13/25* (2018.05); *H04N 13/271* (2018.05); *H04N 17/002* (2013.01); *G06T 2207/10016* (2013.01); *G06T 2207/10021* (2013.01); *G06T 2207/10024* (2013.01); *G06T 2207/10028* (2013.01); *G06T 2207/10036* (2013.01); *G06T 2207/10048* (2013.01); *G06T 2207/10064* (2013.01)

(58) Field of Classification Search
CPC ............. H04N 5/2258; H04N 5/23203; H04N 5/2354; H04N 5/332; H04N 17/002; G06T 7/38; G06T 7/33; G06T 7/593
See application file for complete search history.

(56) References Cited

U.S. PATENT DOCUMENTS

| | | | |
|---|---|---|---|
| 7,305,108 | B2 | 12/2007 | Waehner et al. |
| 7,324,670 | B2 | 1/2008 | Kozakaya et al. |
| 7,336,297 | B2 | 2/2008 | Ishigami et al. |
| 7,340,078 | B2 | 3/2008 | Shikano et al. |
| 7,555,142 | B2 | 6/2009 | Hildreth et al. |
| 7,602,947 | B1 | 10/2009 | Lemelson et al. |
| 7,634,662 | B2 | 12/2009 | Monroe |
| 7,693,413 | B2 | 4/2010 | Sueyyoshi et al. |
| 7,787,013 | B2 | 8/2010 | Yoshida et al. |
| 7,806,604 | B2 | 10/2010 | Bazakos et al. |
| 8,116,534 | B2 | 2/2012 | Nishiyama et al. |
| 8,184,157 | B2 | 5/2012 | Mittal |
| 8,582,833 | B2 | 11/2013 | Chung et al. |
| 8,599,266 | B2 | 12/2013 | Trivedi et al. |
| 8,705,808 | B2 | 4/2014 | Determan et al. |
| 8,754,934 | B2 | 6/2014 | Shi et al. |
| 8,811,661 | B2 | 8/2014 | Hattori |
| 8,855,369 | B2 | 10/2014 | Kikkeri et al. |
| 9,002,057 | B2 | 4/2015 | Outtagarts et al. |
| 9,134,399 | B2 | 9/2015 | Brown et al. |
| 9,179,104 | B2 | 11/2015 | Fan et al. |
| 9,245,276 | B2 | 1/2016 | Golan et al. |
| 9,262,668 | B2 | 2/2016 | Bedros et al. |
| 9,321,173 | B2 | 4/2016 | Kikkeri et al. |
| 9,396,397 | B2 | 7/2016 | Sabripour et al. |
| 9,412,001 | B2 | 8/2016 | Lee et al. |
| 9,544,548 | B2 | 1/2017 | Morisaki |
| 9,607,212 | B2 | 3/2017 | Golan et al. |
| 9,697,414 | B2 | 7/2017 | Baldwin et al. |
| 9,792,489 | B2 | 10/2017 | Golan et al. |
| 2001/0046316 | A1* | 11/2001 | Miyano ............... A61B 5/7425 382/154 |
| 2003/0058342 | A1 | 3/2003 | Trajkovic |
| 2005/0012817 | A1 | 1/2005 | Hampapur et al. |
| 2005/0276452 | A1 | 12/2005 | Boland |
| 2006/0056667 | A1 | 3/2006 | Waters |
| 2006/0120571 | A1 | 6/2006 | Tu et al. |
| 2006/0203090 | A1 | 9/2006 | Wang et al. |
| 2007/0098229 | A1 | 5/2007 | Wu et al. |
| 2007/0127787 | A1 | 6/2007 | Castleman et al. |
| 2007/0177023 | A1 | 8/2007 | Beuhler et al. |
| 2007/0247517 | A1* | 10/2007 | Zhang ................. G06K 9/2018 348/30 |
| 2008/0304716 | A1 | 12/2008 | Hirose |
| 2010/0259539 | A1 | 10/2010 | Papanikolopoulos et al. |
| 2012/0062697 | A1 | 3/2012 | Treado et al. |
| 2012/0182427 | A1 | 7/2012 | Marshall |
| 2013/0249904 | A1* | 9/2013 | Kobayashi ........... H04N 13/302 345/419 |
| 2014/0307952 | A1* | 10/2014 | Sweeney ................... G06T 7/11 382/154 |
| 2014/0320664 | A1 | 10/2014 | Hyun |
| 2014/0375820 | A1 | 12/2014 | Priyantha et al. |
| 2015/0022636 | A1 | 1/2015 | Savransky |
| 2015/0103178 | A1 | 4/2015 | Itoh et al. |
| 2015/0254868 | A1 | 9/2015 | Srikanth et al. |
| 2016/0093181 | A1 | 3/2016 | Lee et al. |
| 2016/0094833 | A1 | 3/2016 | Rouh et al. |
| 2016/0132722 | A1 | 5/2016 | Yarp et al. |
| 2016/0196653 | A1 | 7/2016 | Grant et al. |
| 2016/0350587 | A1 | 12/2016 | Bataller et al. |
| 2017/0019605 | A1 | 1/2017 | Ahiska |
| 2017/0034449 | A1 | 2/2017 | Eum et al. |
| 2017/0053175 | A1 | 2/2017 | Tussy |
| 2017/0085755 | A1 | 3/2017 | Kim et al. |
| 2017/0126972 | A1 | 5/2017 | Evans et al. |
| 2017/0150047 | A1 | 5/2017 | Jung et al. |
| 2017/0270366 | A1 | 9/2017 | Kuznetsov et al. |
| 2017/0336858 | A1* | 11/2017 | Lee ..................... G06F 3/005 |
| 2017/0339329 | A1* | 11/2017 | Lee ..................... H04N 13/254 |
| 2018/0270474 | A1* | 9/2018 | Liu ..................... A61B 6/508 |
| 2020/0121245 | A1* | 4/2020 | Barclay ................. A61B 5/445 |

FOREIGN PATENT DOCUMENTS

| | | |
|---|---|---|
| WO | 2006036398 A3 | 7/2006 |
| WO | 2016100814 A1 | 6/2016 |

OTHER PUBLICATIONS

International Search Report in related application No. PCT/US2018/027539; dated Jul. 31, 2018; 8 pages.

Written Opinion of the International Searching Authority in related application No. PCT/US2018/027539; dated Jul. 31, 2018; 15 pages.

Supplementary European Search Report; European Patent Office; European Patent Application No. 18784681.1; dated Nov. 19, 2020; 8 pages.

* cited by examiner

SYSTEM AND APPARATUS FOR CO-REGISTRATION AND CORRELATION BETWEEN MULTI-MODAL IMAGERY AND METHOD FOR SAME

CROSS-REFERENCE TO RELAYED APPLICATIONS

This patent application claims the benefit of U.S. Provisional Patent Application No. 62/485,583, filed on Apr. 14, 2017, the entire contents of which are incorporated by reference in their entirety.

BACKGROUND

Image registration can include the process of transforming different sets of data into one coordinate system. Image registration can be used in computer vision, medical imaging, military automatic target recognition, and compiling and analyzing images and data from satellites. In some examples, image registration is used to be able to compare or integrate the data obtained from the different measurements.

SUMMARY

In some aspects, the system, apparatus and/or method includes an image capturing device that captures images, including a first sensor includes a first imaging modality, a second sensor includes the first imaging modality, a third sensor includes a second imaging modality, and a controller connected with the first sensor, the second sensor and the third sensor, wherein the controller registers an image captured by the first sensor or the second sensor to an image captured by the third sensor.

In another aspect, the system, apparatus and/or method includes an image capturing device for use with a device having a controller and a communication interface, including a first sensor includes a first imaging modality, a second sensor includes the first imaging modality, a third sensor includes a second imaging modality, and a communication interface adapted to communicate with the communication interface of the device to send an image captured by at least one of the first sensor and the second sensor, and an image captured by the third sensor, to the controller, where the controller of the device registers the first image captured by the first sensor to the second image captured by the third sensor.

In another aspect the system, apparatus and/or method includes registering images of a first imaging modality to images of a second imaging modality, including capturing a first image using a first sensor that includes a first imaging modality, capturing a second image using a second sensor that includes the first imaging modality, capturing a third image using a third sensor that includes a second imaging modality, determining a first depth map for at least one pixel of the first image based on the first image and the second image, and registering the first image or the second image to the third image based on the first depth map.

In another aspect the system, apparatus and/or method includes an image capturing device that captures images, including a first sensor includes a first imaging modality, a second sensor includes the second imaging modality, an actuator, and a controller connected with the first sensor, the second sensor and the actuator, wherein the controller, responsive to a request from the first detector, adjusts the position of the actuator to the requested position to capture an image by the second sensor In another aspect the system, apparatus and/or method includes an image capturing device for use with a device having an image sensor including a second imaging modality, a controller and a communication interface, including a first sensor includes a first imaging modality, an actuator, the actuator mechanically coupled to the device, and a communication interface adapted to communicate with the communication interface of the device to send an image captured by first sensor to the controller, where the controller, responsive to a request from the first sensor, adjusts a position of the actuator to a requested position to capture an image by the image sensor of the device.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The features, objects and advantages other than those set forth above will become more readily apparent when consideration is given to the detailed description below. Such detailed description makes reference to the following drawings, wherein.

Figure 1:
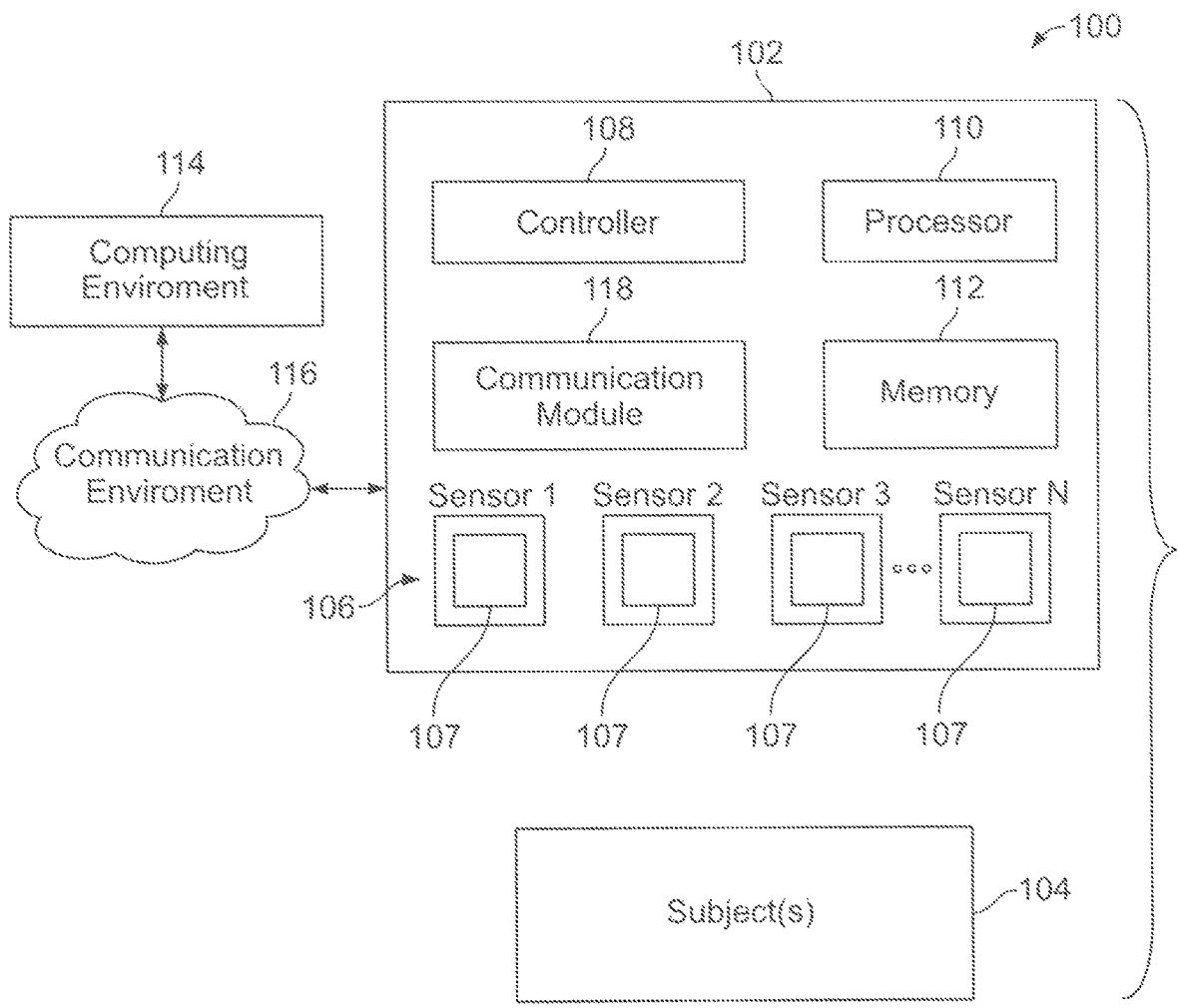
FIG. 1 is a block diagram of an example environment for capturing images.

While the present invention is susceptible to various modifications and alternative forms, exemplary embodiments thereof are shown by way of example in the drawings and are herein described in detail. It should be understood, however, that the description is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the description and the claims for interpreting the scope.

DETAILED DESCRIPTION

A system, apparatus and/or method, generally described as a system, are described more fully hereinafter with reference to the accompanying drawings. The system may be embodied in many different forms and should not be construed as limited to the embodiments set forth herein. Likewise, many modifications and other embodiments of the device described herein will come to mind to one of skill in the art to which the embodiments pertain having the benefit of the teachings presented in the foregoing descriptions and the associated drawings. Therefore, it is to be understood that the system is not to be limited to the specific embodiments disclosed and that modifications and other embodiments are intended to be included within the scope of the appended claims. Although specific terms may be employed herein, they are used in a generic and descriptive sense only and not for purposes of limitation.

Unless defined otherwise, all technical and scientific terms used herein have the same meaning as commonly understood by one of skill in the art to which the embodiments pertain. Although any methods and materials similar to or equivalent to those described herein can be used in the practice or testing of the system, the preferred methods and materials are described herein.

As used herein, an "image", can include a matrix, each element of which is also known as a pixel. For example, a binary image is one 2D matrix whose elements take only two values e.g., either 1 or 0. A gray-scale image includes one 2D matrix, whose elements take a finite values, e.g., integers between (including) 0 and 255. A color image, also known as a visible image or an RGB (red, green, blue) image, includes three 2D matrixes, each of which is the gray-scale image for one color channel. The order of the three matrixes is not fixed. For examples, the order can be RGB, or BGR, or GRB, or any other. In many cases, people use the order RGB or BGR.

The 2D index of the matrixes is also called a "coordinate." Given an index (x,y), the element(s) of the image at the index is called a "pixel". For a gray-scale image, each pixel value is a scalar. For an RGB image, each pixel value is a tuple or a vector where each element of the tuple or vector can correspond to a matrix element in the image.

A modality includes a type of image that capture one or a plurality of properties of objects. For example, an RGB image reflects the vision of world in human eyes and hence is one type of modality. In another example, a near-infrared image is of a different type of modality. In yet another example, the hyperspectral imaging, or terahertz imaging can each be considered as a modality. These modalities are used for the sake of explanation and other types of modalities may be used.

The use of parentheses can have multiple semantics in math formulas. For the notation $p(x,y)$, p is a pixel name and $(x,y)$ is the 2D index or coordinate of the pixel in an image. The notation $I(x,y)$ refers to the intensity value of a pixel whose 2D index is $(x,y)$. Because an image is a 2D matrix of intensities, the notation I when used alone means an image. Adding superscripts (including apostrophes) or subscripts does not change the convention of notations. By notations like $f(p1)$ or $Mz(p1, z)$, f and Mz are function symbols, and the variables embraced by a pair of parentheses are arguments or the function.

The terms first, second, third, etc. used herein, are for the sake of explanation only, and should not be used to limit the embodiments.

FIG. 1 is a block diagram of an example environment 100 for capturing images. The environment 100 can include one or more image capturing devices 102, e.g., cameras or other device, for taking one or more images of one or more subjects 104. The image capturing device 102 can include one or more imaging sensors 1-N 106, or other detectors, for capturing images 107 of the subject 104. The sensors 1-N 106 can be located on a single image capturing device 102 and/or distributed over multiple image capturing devices 102. In some examples, the image capturing device 102 includes, among other things, a controller 108, a processor 110 and a memory 112. The controller 108 can control the taking of images by the sensor 1-N 106. The processor 110 can process data from the images 107 and the memory 112 can store the data. In some examples, the processor 110 and the memory 112 are incorporated in to the controller 108, which is a specially programmed for efficiently and/or economically performing the logic and/or actions described herein. In some examples, the memory 112 stores instructions which when executed by the processor 110 provides execution of the logic and/or actions described herein.

Additionally or alternatively, the image capturing device 102 can include one or more of a power supply, a battery or power cord, microphones, speakers, user interfaces and/or display modules, e.g. LCD monitor, etc., to enable various applications described herein.

In some examples, the processor 110 can register the images 107 captured by the sensors 1-N. In some examples, the processor for registering the images 107 captured by the sensors 1-N is located remotely from the camera 102. For examples, the camera 102 can send the images 107 to a remote computing environment 114, e.g., via a communication module 118 through a communication environment 116. In some examples, the communication environment 116 and/or the communication module 118 can support wired and/or wireless communications, including one of more of cellular communications, satellite communications, landline communications, local area networks, wide area networks, etc. The remote computing environment 114 can include processors and/or memory deployed with local and/or distributed servers. In some examples, the remote computing environment 114 includes a private or public cloud environment, e.g., Amazon Web Services (AWS).

The image capturing device 102 can perform image registration via the different imaging sensors 1-N 106, which can view the subjects 104 from different locations, perspectives, in different modalities and/or with different fields of view (FOVs), etc. In some examples, the sensors 1-N 106 need not image from the same plane, e.g., in a geometry sense, (e.g., CCD/CMOS for visible light imagery or thermistor array for NIR thermal imagery), nor do the centers of imaging need to overlap, e.g., the center of imaging is a mathematical concept for the pinhole camera model. The field of view of image sensors, e.g., sensors 1-N 106, of different modality may be the same or different and the system distortion for each modality may be the same or different.

Given two images 107, the registration can find the mapping from a pixel $p1(x1, y1)$, in the first image I1 to a pixel $p2(x2, y2)$ in the second image I2, e.g., finds a function f: I1→I2. Note that the plane (x1, y1) and the plane (x2, y2) do not have to be parallel. Also, the function f is not determined for all pixels in image I1 because some pixels do not have counterparts in image I2. For the sake of explanation, discussions about registration are among a pair of two images. To expand the registration to register more than two images, in some examples the images can be registered pair by pair. Although the registration is described among images of two different modalities, the registration can be expanded to handle images of more than two modalities.

Figure 2:
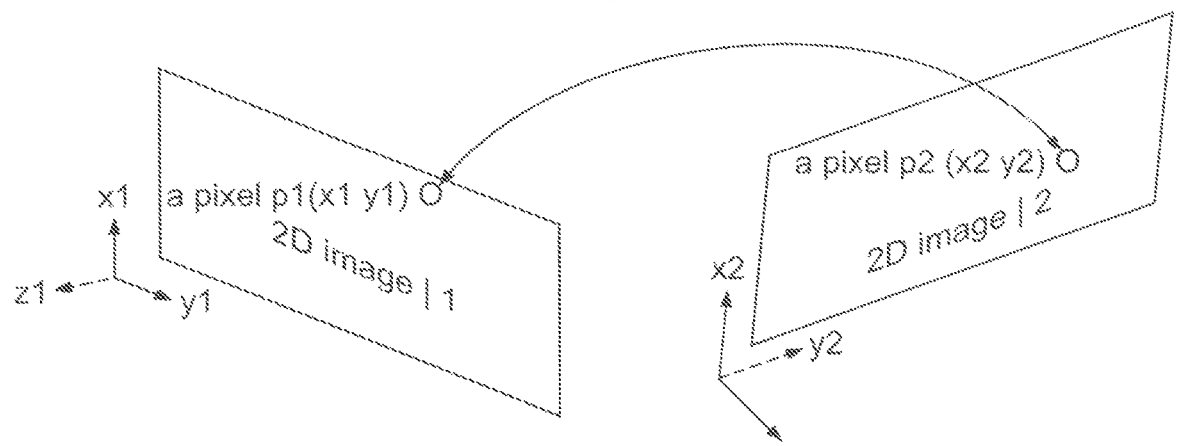
FIG. 2 is a block diagram of an example 2D-to-2D deterministic mapping based on a parameter z.

FIG. 2 is a block diagram of an example 2D-to-2D deterministic mapping of images 107 based on a parameter z. With the parameter z, the system can establish an underlining 1-to-1 mapping between the two 2D images. For the sake of explanation, each pixel in image I1 has a z value associated with it. In some examples, the parameter z is not measured in parallel with any imaging plane. Mathematically z remains the same when moving on the imaging plane or on any plane that is parallel to the imaging plane. In some examples, the parameter z may be depth, e.g., how far the source (e.g. part of an object) of a pixel is to the imaging plane. In another example, the parameter z does not have any physical meanings, but is a parameter that correctly registers two images. For example, the parameter z can be disparity value obtained from two images of the same modality but two imaging sensors.

By using the z parameter, e.g., the depth information, there is a deterministic function from any pixel $p1(x1, y1)$ in image I1 to its counterpart $p1(x2, y2)$ in image I2, given that the value z is known. This function can be denoted as Mz: I1×z→I2, where the times symbol "X" means Cartesian product. The function Mz can be obtained via calibration or computation. The computational approach can be done by using intrinsic and extrinsic parameters of the imaging sensors. Establishing or using the function Mz does not require reconstructing 3D world or using a 3D model, providing advantages over other methods in computer graphics. For different definitions of parameter z, there are different Mz. However, the registration function f remains the same regardless of the definition of parameter z, as long as the two imaging sensors do not change relative location, translation, and orientation. The Mz is a black box connecting two 2D images. Similar to the function f, the function Mz is only determined for some pixels in image I1 that have counterparts in image I2.

Once the parameter z is known, the function Mz can be transformed to the registration function f. Although there are many ways to represent a function, a set of tuples is used for the sake of explanation. The last element of a tuple is a value and all preceding elements are arguments: For each pixel p1 in I1, create a tuple (p1, p2) such that the depth of p1 is d, and Mz(p1, d)=p2, where p2 is a pixel in I2. In one implementation, the functions Mz and f can be stored in lookup tables, arrays, dictionaries, and many other data structures.

Many objects are non-transparent to optical rays, e.g., white light, unlike X-ray. Optical rays, which can be used for color imaging, infrared imaging, thermal imaging, hyperspectral imaging, etc., cannot penetrate most objects that are not transparent. In some examples, information about z provided by the first imaging modality can be used for registering for the second imaging modality.

Figure 3:
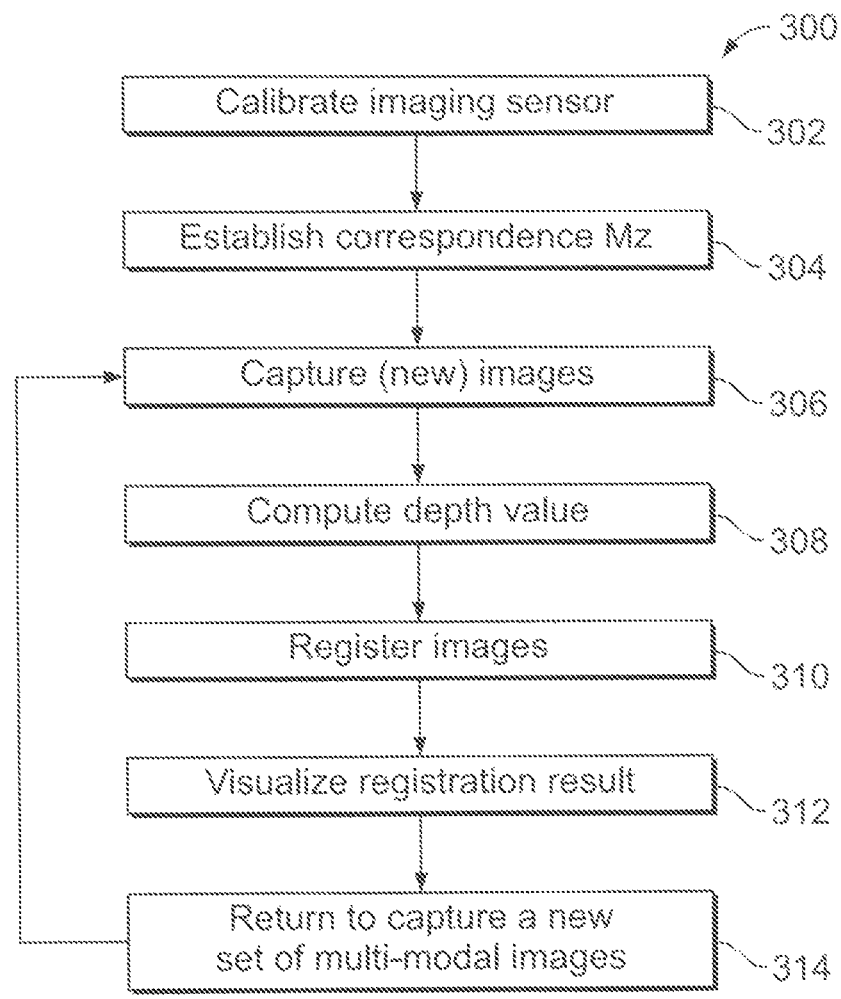
FIG. 3 is a flowchart of an example logic to register images using the z parameter.

FIG. 3 is a flowchart 300 of an example logic to register images using the z parameter. The logic calibrates imaging sensors of the first modality and imaging sensor(s) of the second modality (302). In some examples, the second modality may only have one imaging sensor. For the sake of explanation, the image sensors can include one or more sensors 1-N 106. In some examples, there are two images sensors of the first modality and one image sensor of the second modality, but other combinations of sensors can be used. The calibration may only need to be performed once depending on an implementation. In some examples, the logic performs the calibration periodically. The logic can establish the function Mz via computation and/or calibration, e.g., as performed once for determined sensors (304). The image capturing device 102 captures images using the imaging sensors of the first modality and the imaging sensor(s) of the second modality (306). The logic computes the z value for a plurality of pixels in either the first imaging modality or the second imaging modality (308). For every pixel p1(x1,y1) in image I1, the z value can be determined, then Mz(p1, z) applied to obtain the corresponding pixel p2(x2, y2). The logic registers the images of the first imaging modality to the images of the second imaging modality based on Mz (the registration function f can be constructed explicitly or not) (310). For all pixels in image I1, the registration function f is established. Thereafter, the registration result can be visualized/displayed, or used for additional computer vision analysis, depending on an implementation (312). For example, images can be superposed or be visualized/displayed by an alpha composition. The image capturing device 102 can be used to capture a new set of multi-modal images (314). The logic can run iteratively for every new set of images of at least two modalities. Because the z value for each pixel may change between iterations (e.g. the objects in the environment moves), the registration function f is updated for at least those pixels whose z value changes between iterations.

Once the function Mz is determined, Mz can be stored locally to the image capturing device 110 and/or remotely in the remote computing environment 114, and reused as long as the imaging sensors, e.g 1-N 107 are at the same relative positions to each other. Therefore, there is no need to regenerate the Mz all the time. Sometimes the second modality may be the same or similar as the first modality. For example, the first modality can use a lower resolution color image sensors and the second modality can include high resolution color image sensors.

Figure 4:
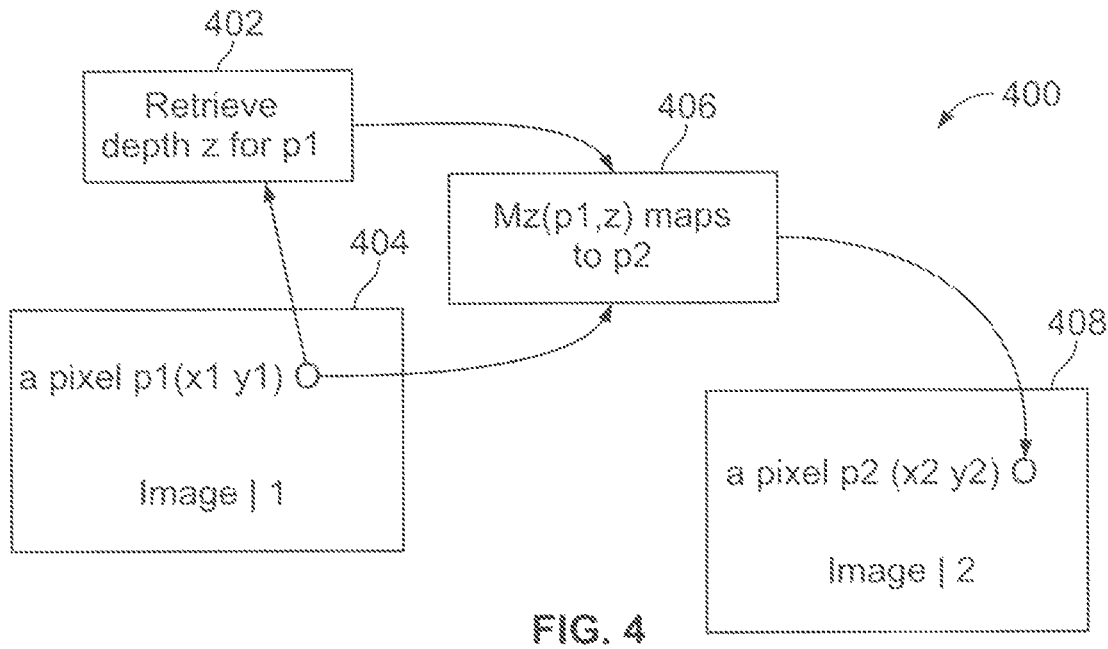
FIG. 4 is a block diagram of an example architecture for depth based registration.

FIG. 4 is a block diagram of an example architecture 400 for depth based registration. Depth based registration can occur when the z coordinate is the depth perpendicular to at least one imaging sensor 1-N 106, or a hypothetical plane defined with respect to at least one imaging sensor. The imaging sensors can be manufactured as a rectangular plane and their edges provide a natural definition of x and y axis. In one example, the depth can be estimated from images of a pair of cameras, e.g., a pair of cameras of the same imaging modality, where the pair of cameras can work on visible light, infrared light, other modalities, or the combination thereof. For each imaging sensor in the pair of cameras, the system can establish the depth value.

The logic can register two images via a deterministic function Mz that has a variable z. When z is the depth, at different depths, the correspondence between pixels on two images are different. For example, the system can retrieve (402) depth z for p1 from image I1 (404). The system can map (406) Mz(p1, z) to p2 of Image I2 (408). The depth map itself, the result of processing data from the first and second sensors of the first modality, is an image too. In some aspects, the depth map is already registered with one of the imaging modalities.

Figure 5:
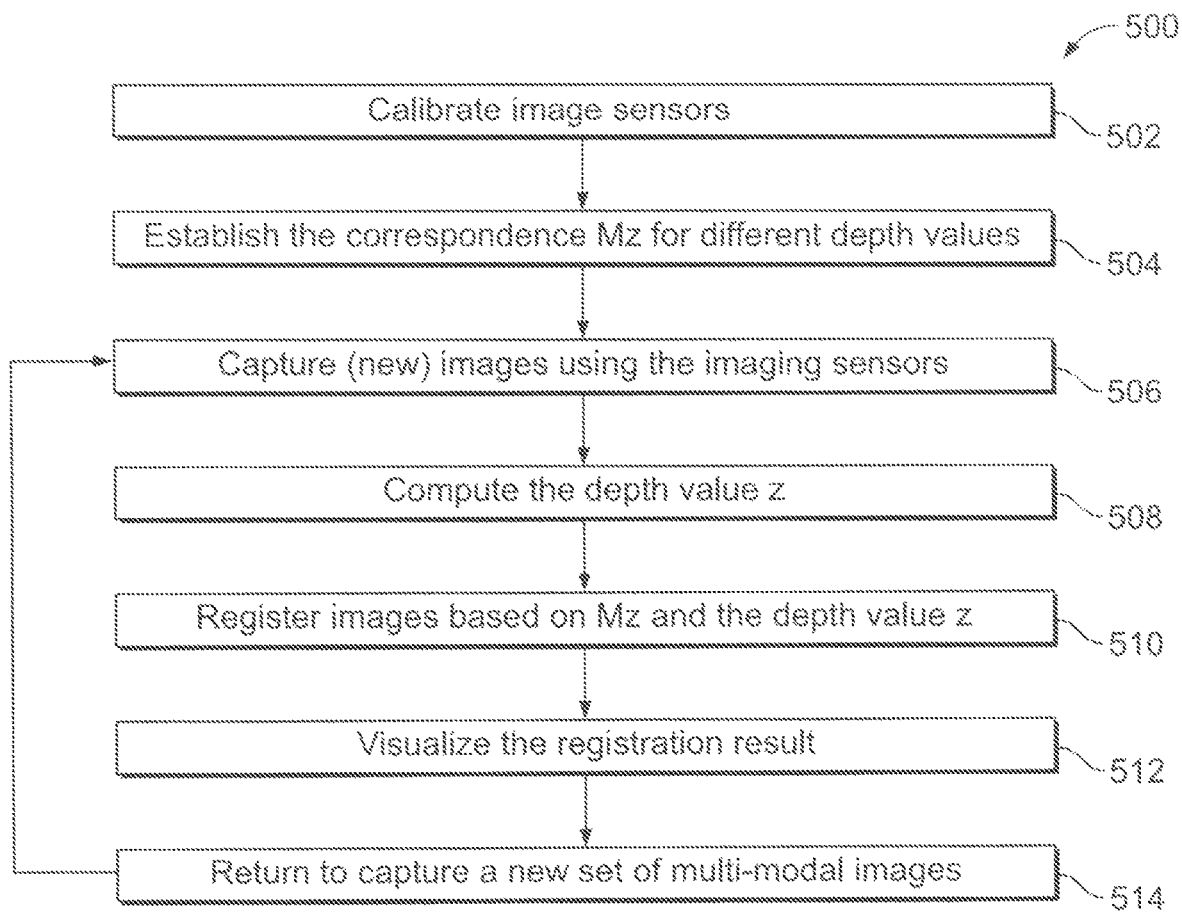
FIG. 5 is a flowchart of an example logic for depth based registration.

FIG. 5 is a flowchart 500 of an example logic for depth based registration. The logic can calibrate the imaging sensors of the first modality and the imaging sensor(s) of the second modality (502). The imaging sensors 1-N 106 may only need to be calibrated once, or they can be calibrated as needed. The logic can establish the correspondence Mz between images of the first modality and images of the second modality for different depth values via computation and/or calibration (504). This may only need to be performed once. The logic can capture (new) images using the imaging sensors of the first modality and the imaging sensor(s) of the second modality (506). The logic can compute the depth value z for a plurality of pixels in the first imaging modality (508). The logic can register images of the first imaging modality to the images of the second imaging modality based on Mz and the depth value z (510). In some examples, the registration result can be visualized/displayed (512). In other examples, visualization/display (512) is optional. The registration results can be used for analysis, e.g., computer vision without being visualized or displayed. The logic can optionally capture a new set of multi-modal images, etc. (514).

Figure 6:
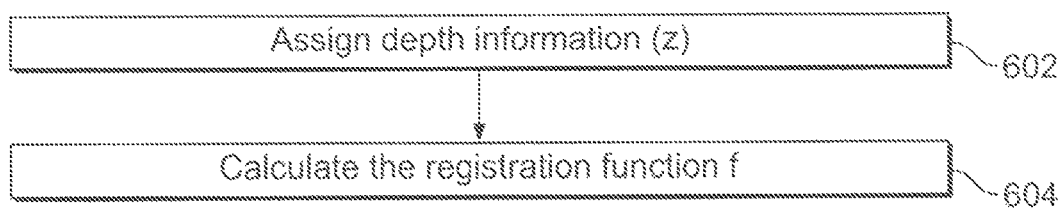
FIG. 6 is a flowchart of an example logic of one way to register images.

FIG. 6 is a flowchart 600 of an example logic of one way to register images of the first imaging modality to the images of the second imaging modality based on Mz and the depth value z. First, the logic can assign depth information (z) for pixels in images from the first imaging modality, so that each pixel has a corresponding depth information z (602). Then, the logic can calculate the registration function f for registering the images from the first imaging modality to the images of the second imaging modality (604).

Figure 7:
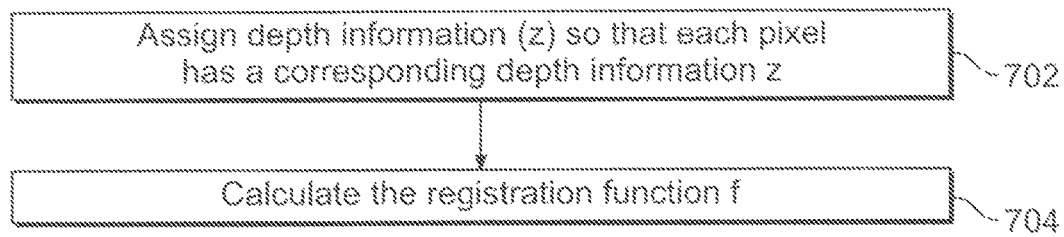
FIG. 7 is a flowchart of an example logic of another way to register images.

FIG. 7 is a flowchart 700 of an example logic of another way to register images of the first imaging modality to the images of the second imaging modality based on Mz and the depth value z. When the first modality has two image sensors and the second modality has one image sensor, the logic can assign depth information (z) for pixels in images of the image sensor of the first imaging modality, so that each pixel has a corresponding depth information z (702). Then, the logic can calculate the registration function f for registering images from the image sensor from the first imaging modality to the images from the image sensor of the second modality (704).

Figure 8:
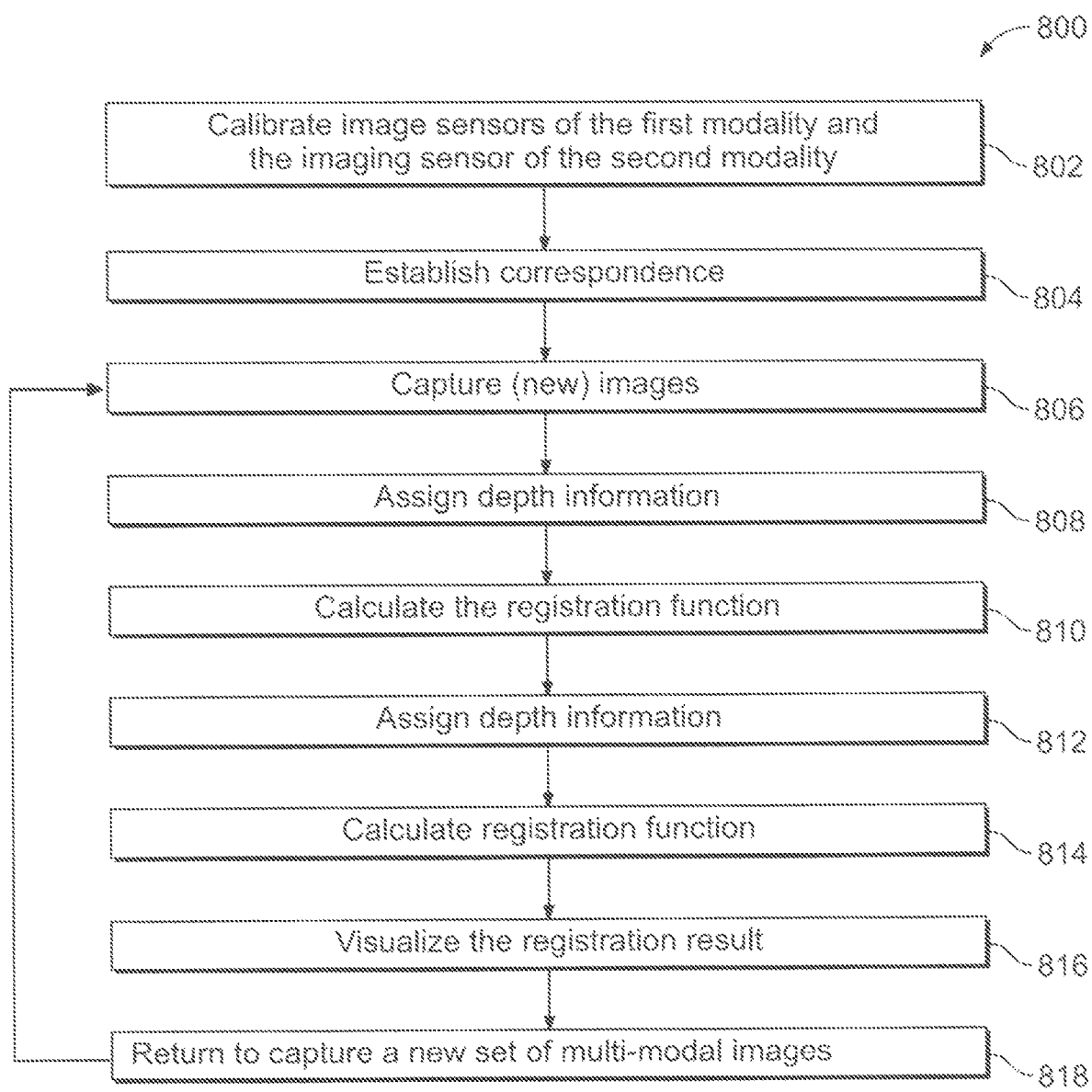
FIG. 8 is a flowchart of an example logic of another way to register images.

FIG. 8 is a flowchart 800 of an example logic of another way to register images of the first imaging modality to the images of the second imaging modality based on Mz and the depth value z. In this example there are two image sensors of the first imaging modality and one image sensor of the second imaging modality. In the case that images from both the image sensors of the first modality are registered to the image sensor of the second modality, the logic can calibrate the imaging sensors of the first modality and the imaging sensor of the second modality (802). This may only need to be performed once. The logic establishes the correspondence Mz1 between images of image sensor of the first modality and images of the second modality, and the other correspondence Mz2 between images of second image sensor of the first modality and images of the second modality, for different depth values via computation and/or calibration (804). This may only need to be performed once. The logic can then capture (new) images using the imaging sensors of the first modality and the imaging sensor of the second modality (806). The logic can assign depth information (z) for pixels in images of the first image sensor of the first imaging modality, so that each pixel has a corresponding depth information z (808). The logic can calculate the registration function f1 for registering images from the first image sensor of the first imaging modality to the images of the image sensor of the second modality based on Mz1 (810). The logic can assign depth information (z) for pixels in images of the second image sensor of the first imaging modality, so that each pixel has a corresponding depth information z (812). The logic can calculate the registration function f2 for registering images from the second image sensor of the first imaging modality to the images of the image sensor of the second modality based on based on Mz2 (814). Thereafter, the registration result can be optionally visualized/displayed (816). The logic can optionally capture new sets of multi-modal images, etc. (818).

Additionally or alternatively, the depth information can be stored as an image Iz, with its own pixel coordinates Iz(xz,yz). The logic can register the image of the first modality with the depth image. The logic can then register the image of the second modality with the depth image. With the depth image serving as the bridge between the images of the first modality and the second modality, the image of the first modality is therefore registered with the image of the second modality. The depth information is also sometimes called a depth map.

In one example, the first imaging modality includes two image sensors and the second imaging modality includes one image sensor. A need of only one image sensor from the second imaging modality can be advantageous. For example, the first imaging modality can be color imaging, and the cost of each image sensor for color imaging is typically low. The second imaging modality can be thermal imaging, and the cost of each image sensor for thermal imaging is typically high. Therefore, not needing more than one image sensor of the second imaging modality can be desirable. However, other numbers of sensors can be used. Based on the images captured from the image sensors of the first imaging modality, a disparity map can be calculated to be used as the parameter z. The disparity map calculation matches pixels in images from the first image sensor of the first imaging modality with pixels in images from the second image sensor of the first imaging modality, and computes the distance, e.g., expressed in pixels, between counterpart pixels in the images of the sensors of the first modality. With the disparity map, a 2D image can be obtained where every pixel contains the disparity value for that pixel.

Figure 9:
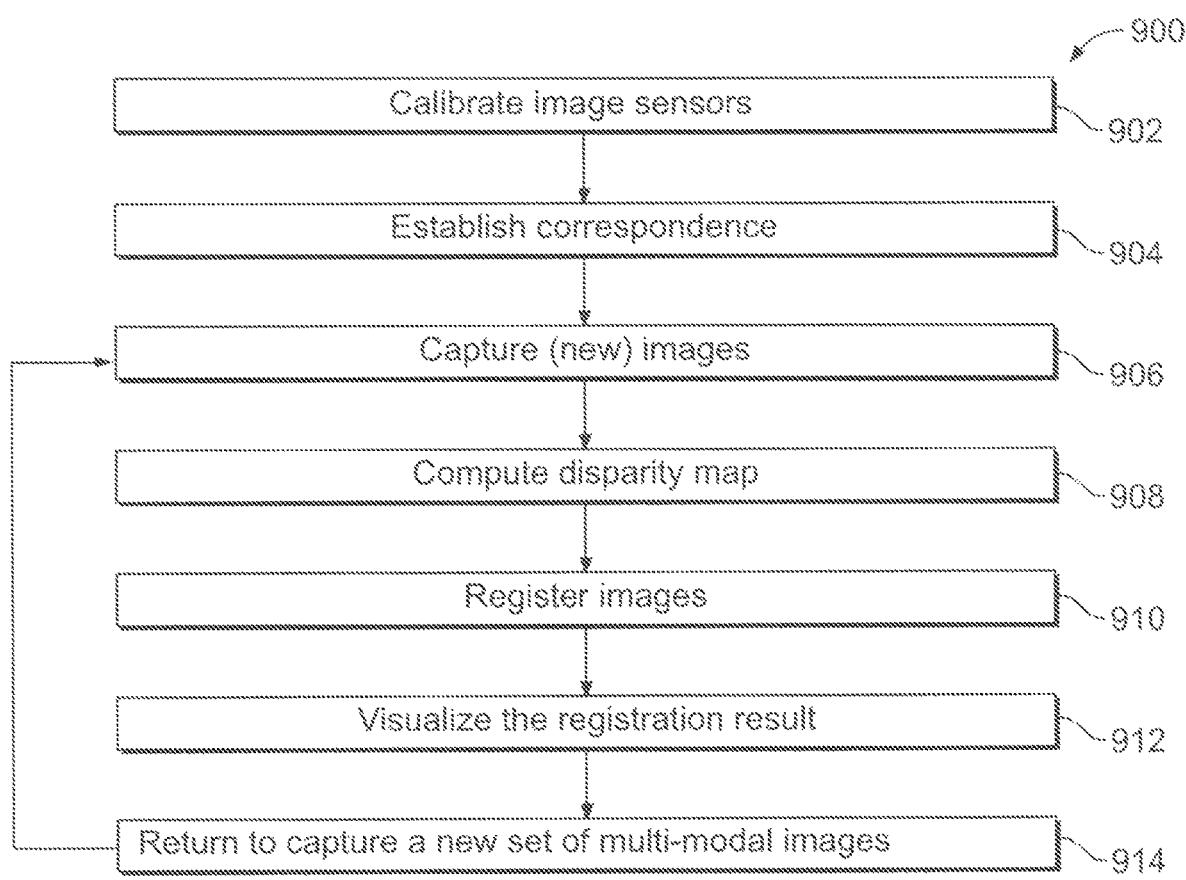
FIG. 9 is a flowchart of an example logic for when a disparity map is used with the parameter z.

FIG. 9 is a flowchart 900 of an example logic for when the disparity map is used with the parameter z. The logic can calibrate the imaging sensors of the first modality and the imaging sensor(s) of the second modality (902). The logic can establish the correspondence Mz between images from an imaging sensor of first modality and images of the second modality for different disparity/depth values z via computation and/or calibration (904). The logic can capture (new) images using the imaging sensors of the first modality and the imaging sensor(s) of the second modality (906). The logic can compute the disparity map for a plurality of pixels using images from the first image sensor of the first imaging modality and images of the second image sensor of the first imaging modality (908). The logic can register images from imaging sensor of first imaging modality to images from the second imaging modality based on Mz and the disparity map of parameter z (910). In some examples, the registration result can be optionally visualized/displayed (912). In some examples, the logic can optionally capture a new set of multi-modal images, etc. (914).

Sometimes the first imaging modality may use more than one image sensor (e.g. 2 image sensors), and the second imaging modality use one image sensor. In that case, images from one or a plurality of image sensors of the first modality may be registered with the second modality. Depth-based registration can occur between thermal and visible/color/near-infrared images. In one example of the depth-based registration, the first imaging modality is color imaging (e.g., RGB images) and the second imaging modality is thermal imaging (e.g. infrared images). In one example, there are two visible/color image sensors and one thermal image sensor. The correspondence between pixels in the color images and thermal images is established via the depth map, as previously discussed. In some examples, the logic can assign depth values to the pixels of the color/visible images, as discussed above. In another example, the logic first registers at least one of the first two images of the first modality (e.g. images from the first image sensor of the first modality) with the depth map. Then the logic can register one of the first two images of the first modality with images of the second modality based on the depth values.

Figure 10:
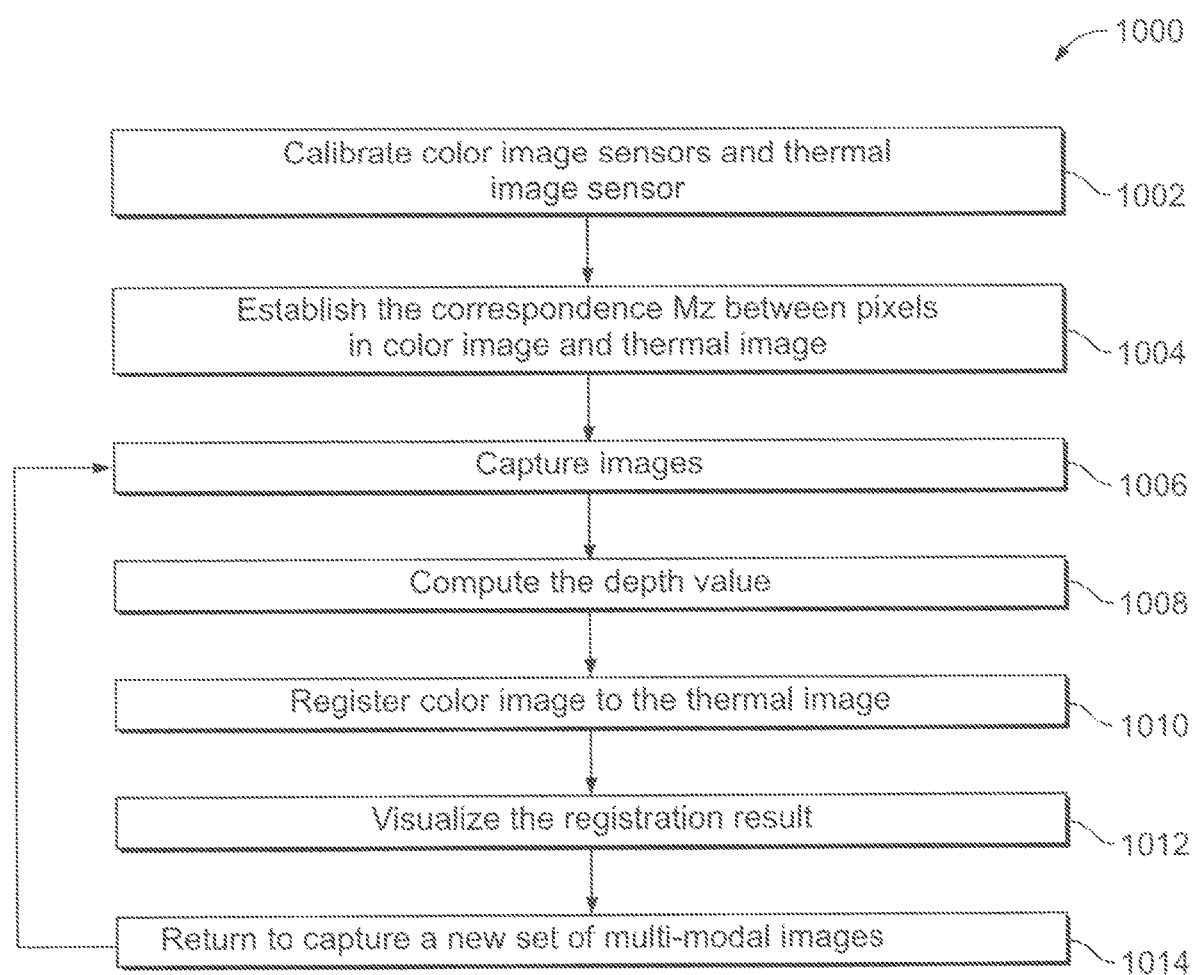
FIG. 10 is a flowchart of an example logic for generating a depth map using image sensors of the same modality.

FIG. 10 is a flowchart 1000 of an example logic for generating the depth map using two image sensors of the same modality, e.g., two color image sensors. The logic can calibrate the color imaging sensor and the thermal imaging sensor (1002). Calibration may only need to be performed once. The logic can establish the correspondence Mz between pixels in the color images and thermal images for different depth values via computation and/or calibration (1004). The logic can capture (new) images using the color imaging sensors and the thermal imaging sensor (1006). The logic computes the depth value z for a plurality of pixels in color images (1008). The logic registers the color image to the thermal image based on Mz and the depth value z (1010). In some examples, the registration result of color and thermal images can be optionally visualized/displayed (1012). In some examples, the logic can capture a new set of multi-modal images (1014).

Figure 11:
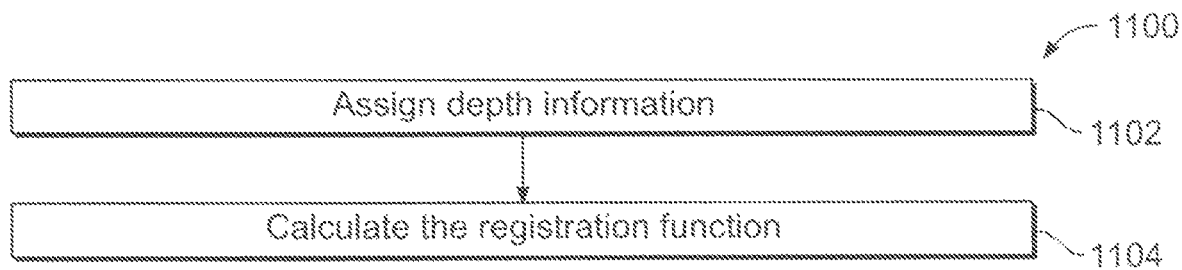
FIG. 11 is a flowchart of an example logic for registering the color image to the thermal image.

FIG. 11 is a flowchart 1100 of an example logic for registering the color image to the thermal image based on Mz and the depth value z. The logic assigns depth information (z) for pixels in the color image, so that each pixel has a corresponding depth information z (1102). The logic calculates/determines the registration function f for registering the color image to the thermal image based on Mz obtained above (1104).

Figure 12:
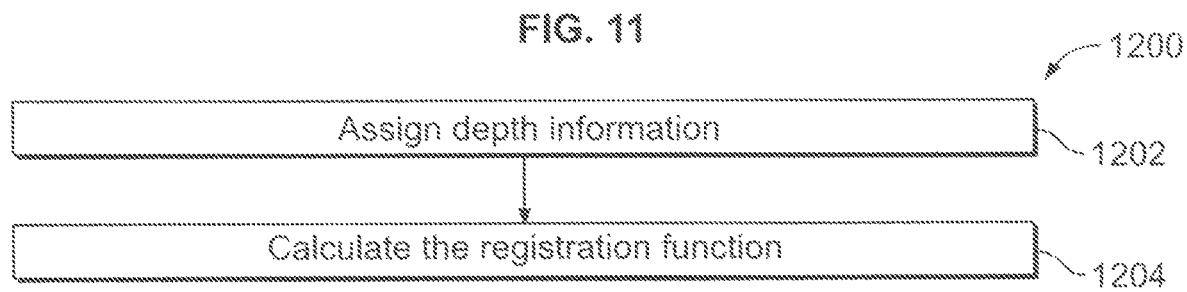
FIG. 12 is a flowchart of an example logic for registering the color image to the thermal image based on Mz and the depth value z.

FIG. 12 is a flowchart 1200 of an example logic for registering the color image to the thermal image based on Mz and the depth value z. When the color imaging has two image sensors and the thermal imaging has one image sensor, the logic can assign depth information (z) for pixels in images of the first image sensor of the first imaging modality, so that each pixel has a corresponding depth information z (1202). The logic can calculate/determine the registration function f for registering images from the first color image sensor to the image from the thermal image sensor (1204).

Figure 13:
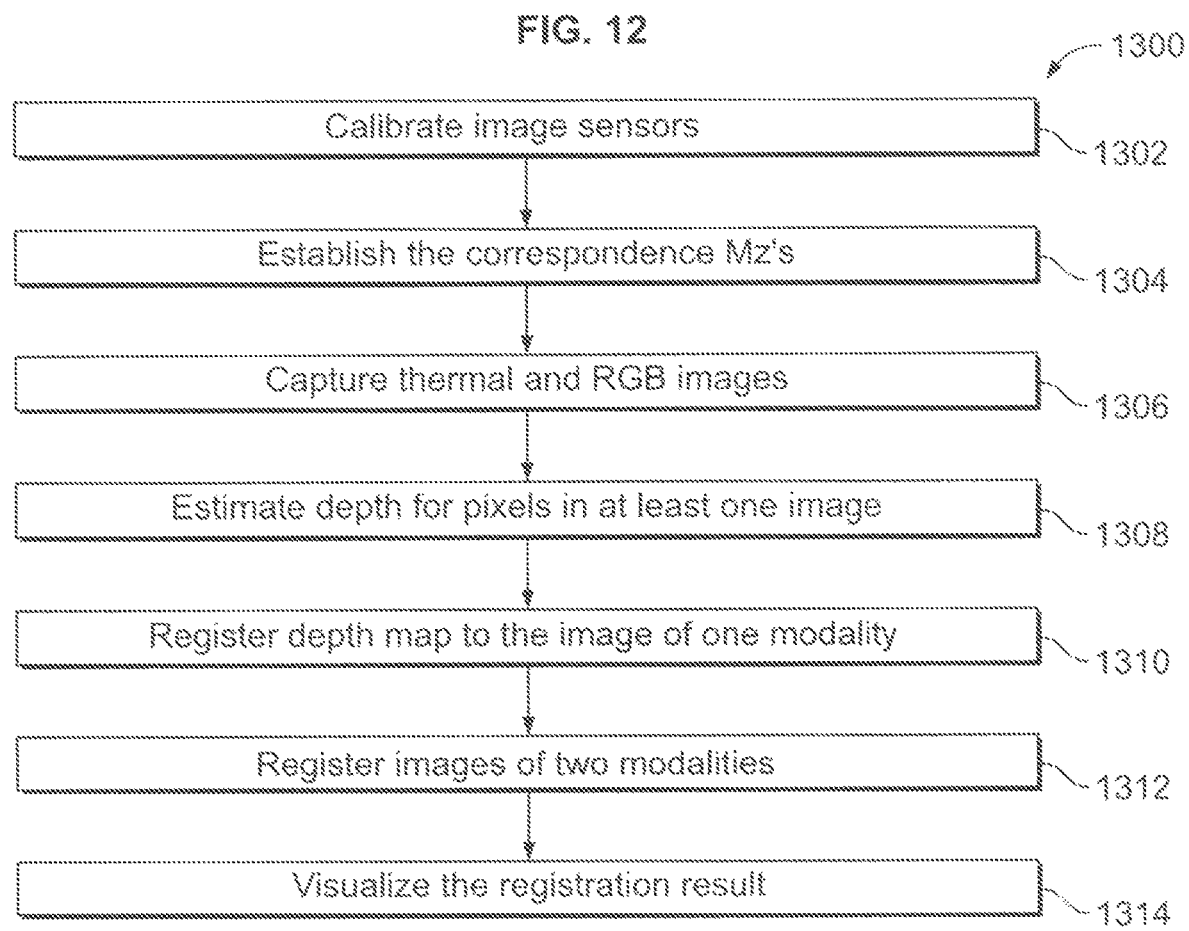
FIG. 13 is a flowchart of an example logic for capturing and registering multiple thermal and multiple RGB images.

FIG. 13 is a flowchart 1300 of an example logic for capturing and registering multiple thermal and multiple RGB images. At least once, the logic can calibrate imaging sensors of at least two modalities (1302). At least once, the logic can establish the correspondence Mz's between pixels in different images for different depth values via computation and/or calibration (1304). The logic captures (new) thermal and RGB images (1306). The logic estimates depth for pixels in at least one image (1306). The logic registers depth map with at least one thermal or RGB image, denoted as Image A (1308). The logic registers Image A with any other images based on the depth values for a portion of or all pixels in image A using corresponding Mz's obtained (1310). The registration result can be optionally visualized/displayed (1314). If the logic registers n pairs of images, then n Mz's can be established. The monochrome images or near-infrared images work in a similar way as the color images in coregistration with thermal images. Similarly, the depth map can be computed/determined using two monochrome image sensors or two near-infrared image sensors. Therefore, the logic can be applied to registration between near-infrared images and thermal images.

Figure 14:
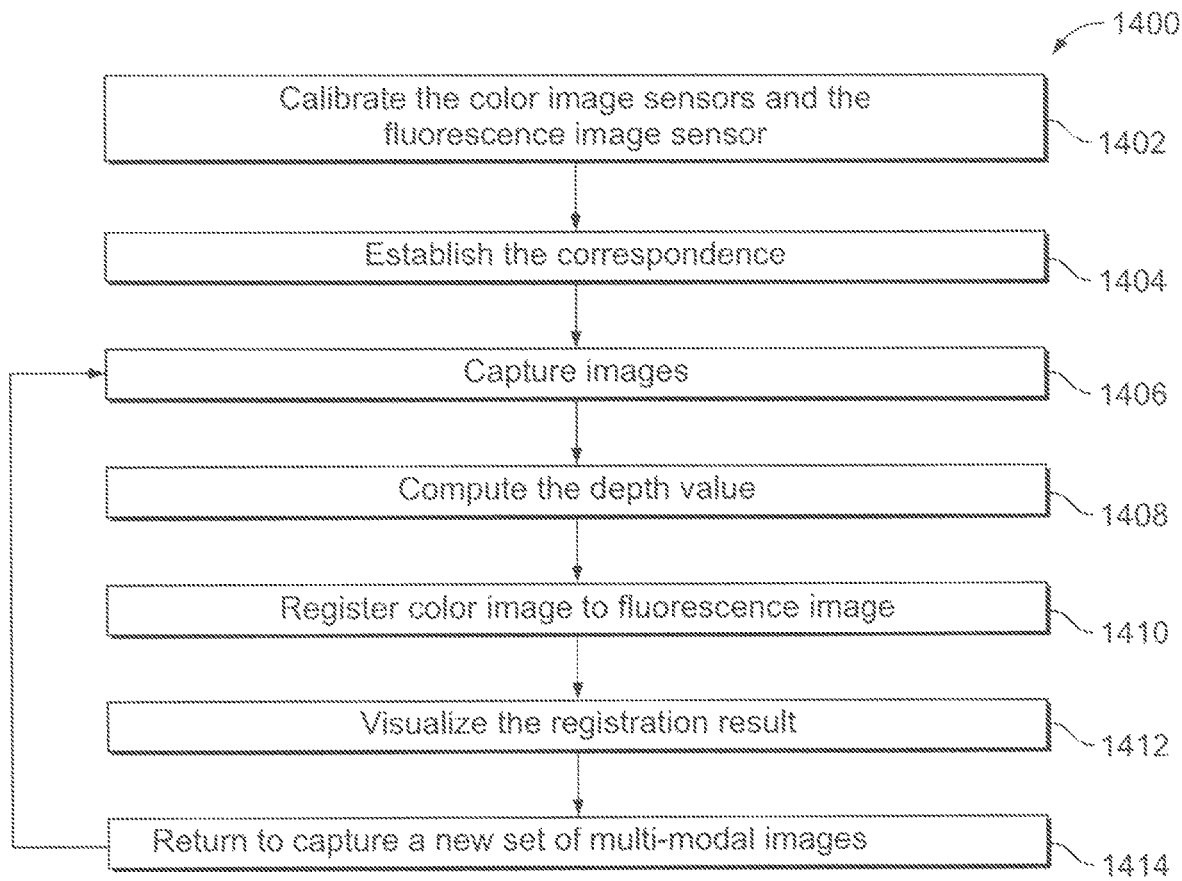
FIG. 14 is a flowchart of an example logic for depth-based registration between fluorescence and visible/color images.

FIG. 14 is a flowchart 1400 of an example logic for depth-based registration between fluorescence and visible/color images. For the sake of explanation, one image can be a fluorescence image while the other can be an RGB image. At least once, the logic can calibrate the color imaging sensor and the fluorescence imaging sensor (1402). At least once, the logic can establish the correspondence Mz between pixels in the color images and fluorescence images for different depth values via computation and/or calibration (1404). The logic captures (new) images using the color imaging sensor and the fluorescence imaging sensor (1406). The logic computes the depth value z for a plurality of pixels in color image (1408). The logic register color image to the fluorescence image based on Mz and the depth value z (1410). In some examples, the registration result of color and fluorescence images can be visualized/displayed (1412). In some examples, the logic can return to capture a new set of multi-modal images (1414).

Figure 15:
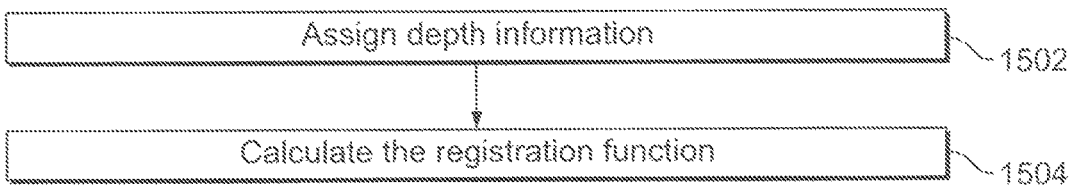
FIG. 15 is a flowchart of an example logic to register color images to the fluorescence images based on Mz and the depth value z.

FIG. 15 is a flowchart 1500 of an example logic to register color images to the fluorescence images based on Mz and the depth value z. The logic can assign depth information (z) for pixels in the color image, so that each pixel has a corresponding depth information z (1502). The logic can calculate/determine the registration function f for registering the color image to the fluorescence image based on the Mz obtained (1504). The logic can treat the color imaging as the first imaging modality and fluorescence as second imaging modality. For example, there can be two color image sensors and one fluorescence image sensors and depth map is extracted from the fluorescence images. In another some aspects, the fluorescence imaging can be treated as the first modality and the color imaging can be treated as the second modality. For example, there can be two fluorescence image sensors and one color image sensors and depth map is extracted from the fluorescence images.

Figure 16:
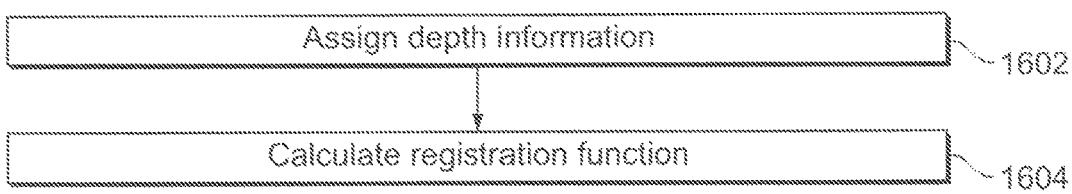
FIG. 16 is a flowchart of an example logic when the color imaging has two image sensors and the fluorescence imaging has one image sensor.
Figure 17:
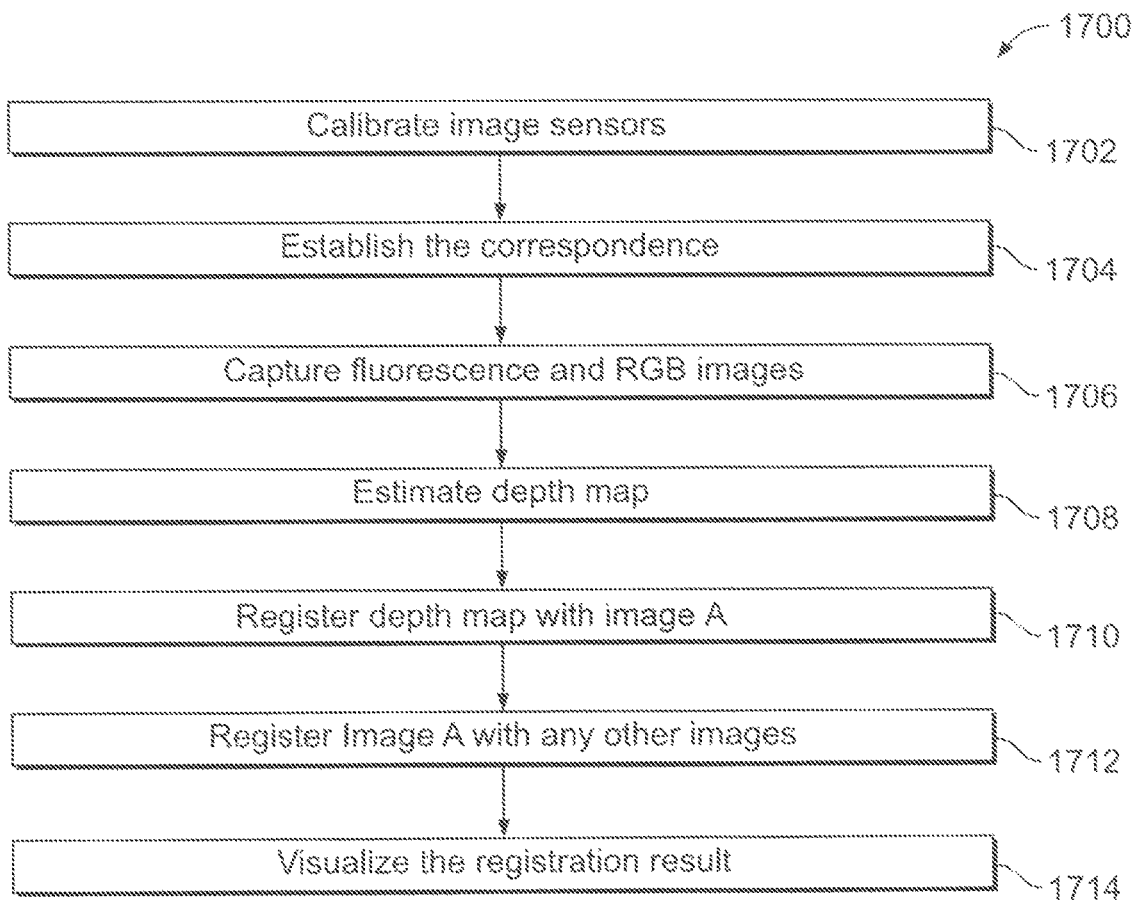
FIG. 17 is a flowchart of an example logic for registering a depth map with at least one thermal or RGB image.

FIG. 16 is a flowchart 1600 of an example logic when the color imaging has two image sensors and the fluorescence imaging has one image sensor. The logic can assign depth information (z) to pixels of color images, so that each pixel has a corresponding depth information z (1602). The logic can calculate registration function f for registering images of the first color image sensor to the images of the fluorescence image sensor (1604). The logic can treat the color imaging as the first imaging modality and fluorescence as second imaging modality. Optionally, the logic can calculate registration function f for registering images of the second color image sensor to the images of the fluorescence image sensor in a similar way. some aspects FIG. 17 is a flowchart 1700 of an example logic for registering a depth map with at least one fluorescence or RGB image. At least once, the logic can calibrate imaging sensors of at least two modalities (1702). At least once, the logic can establish the correspondence Mz between pixels in different images for different depth values via computation and/or calibration (1704). The logic captures (new) fluorescence and RGB images (1706). The logic estimates a depth map (1708). The logic registers the depth map with at least one fluorescence or RGB image, denoted as Image A (1710). The logic registers Image A with any other images based on the depth values for all pixels in image A (1712). In some examples, the registration result can be visualized/displayed (1714).

The system can capture and register multiple fluorescence and multiple RGB images, e.g., as described above. For n pairs of images, n Mz's can be established. In some examples, narrow band images, e.g., filtered images, can be registered to color images, e.g., as described in FIGS. 6 and 7. Oxygen saturation images (combination of narrow band images) can be also register to color images. Additionally or alternatively, monochrome imaging can be used to image reflectance, instead of color imaging. For example, the first modality can be monochrome image sensor for reflectance imaging and the second modality can be fluorescence imaging. In this case, the registration can be done in a similar way as discussed with color-fluorescence image registration.

Other imaging modalities may also be applied for co-registration. In one example, the first imaging modality is color imaging the second modality is hyperspectral imaging. The hyperspectral images can be therefore registered with color images. In another example, the first imaging modality can be color imaging and the second modality can be vein imaging/vasculature imaging, e.g., either transmission geometry or reflectance geometry. For example, the vein images can be registered with color images to provide better placement of intravenous injection. In some examples, each image has the same frame rate and the same resolution. Several different examples are discussed below. Although use registration between two imaging modalities is used as the example, similar logic can be implemented to expand to image registration of more than two modalities. Also, while the use of depth map is used as an example, the logic can be generalized to the general for any parameter z.

In some examples, images of one modality have a lower resolution than the images of the other modality. For the sake of explanation, the images of lower resolution can be donated as Ilow and the images of higher resolution as Ihigh. In this case, multiple pixels in Ihigh are registered with the same pixel in Ilow. There are many ways to take advantage of this. In some examples, Ihigh can be downsampled to the same resolution as Ilow before registration using any of the logic mentioned above or other image registration algorithm. The downsampled image can be denoted from Ihigh as Idown. Because the mapping from Ihigh to its downsampled, counterpart Idown is known during the downsampling process, the function denoted as d: Ihigh→Idown. Once Ilow and Idown are registered, resulting in the function f: Idown→Ilow, the logic can register Ilow to Ihigh by using the composed function f ° g. In this way, the complexity of the registration can be determined by the lower resolution of the two images.

In another example, Ilow can be upsampled to the same resolution as Ihigh before registration using any of the logic mentioned above or any other image registration algorithm. It is possible that images of one modality have a lower temporal sampling rate, also known as the frame rate, than images of the other modality. The one of lower temporal sampling rate can be denoted as Islow and the one of higher sampling rate as Ifast. There are many ways to take advantage of this. In one example, the registration rate is determined by the lower sampling rate. Registration happens between an Islow and an Ifast that is synchronized with it. No new registration occurs unless the next Islow becomes available. In another example, the registration rate is determined by the higher sampling rate. Islow is temporally interpolated to generate Iinterpolated, which has the same sampling rate as Ifast. The images of the two different modalities are registered using Iinterpolated and Ifast.

In some examples, the depth sensing rate is adjustable. Estimating the depth map can be computationally costly. The depth map construction does not have to run all the time. The frequency that a depth map is renewed can be determined as depth sensing rate. In some examples, the frequency can be measured in unit of frames per second. For example, if using pair of cameras, e.g., two images sensors of the same modality, the depth map does not have to be constructed for every pair of new images captured by the pair of cameras. In one example, the depth map update rate is a multiplier of the sampling rate of at least one imaging sensor. In another example, the depth map update rate can be controlled by the amount of changes between depth maps in a period of time, e.g., in a sliding window. If depth maps change a lot in that temporal sliding window, then the depth map can be updated more frequently, otherwise, they can be updated less frequently. In yet another example, the frequency that a depth map is renewed based on if there is moving object. Using a motion detection algorithm (on the first modality images and/or on the second modality images), the depth map can be renewed when motion is detected.

The amount of changes across a sequence of N (N>=2) depth maps D1, D2 through DN can be quantified in various ways. One way is to subtract two consecutive depth maps pair-by-pair (resulting in a sequence of differential matrixes), then run element-wise square (or absolute value or other similar functions) on the differential matrixes, and finally add up all elements in all differential matrixes:

$$C = \text{sum}\left(\sum_{i=1}^{N-1}(D_i - D_{i+1}) \cdot (D_i - D_{i+1})\right)$$

where circle means Hadamard product [https://en.wikipedia.org/wiki/Hadamard_product_(matrices)] and the function sum( ) means summing all elements in a matrix. To determine whether the depth sensing rate has to go up or down, compare a threshold against C. In yet another way, the amount of changes across a sequence of depth maps can be region or feature weighted. In this way, the amount of changes of depth maps is a weighted sum of depth changes from pixels. This can be done by applying a weight mask matrix in our definition to C above:

$$C = M \cdot \text{sum}\left(\sum_{i=1}^{N-1}(D_i - D_{i+1}) \cdot (D_i - D_{i+1})\right).$$

The weight matrix M can be obtained in multiple ways. For example, pixels from regions of interest (ROIs) defined by other algorithms or human have higher weights than the rest of the image. In another example, the M can simply be the total sum of depth maps in a sequence:

$$M = \sum_{i=1}^{N} D_i$$

such that deeper pixels have higher weights. In yet another example, we can let closer pixels have higher weights, e.g., let each element in $$M_{jk} = 1 \bigg/ \left(\sum_{i=1}^{N} D_i\right)_{jk}.$$

In other words, the ratio of depth change matters. The length of the sequence N is an adjustable constant, e.g., the total time elapsed to sample the N depth maps equal or approximates to another threshold such that the amount of changes of depth defined above makes sense regardless of the depth sensing rate.

If the depth sensing rate needs to be increased or decreased, there are also multiple ways. In one way, the depth sensing rate can be set at a few fixes values, each of which maps to one range of C values above. For example, there can be two depth sensing rates, one for fast change on depth map (high C) and the other for slow change on depth map (low C), and the logic automatically switches between the two depending on the amount of change in depth map. In another way, the depth sensing rate can be related to the amount of changes on depth map in a sequence of depth maps (e.g., C or other measurements). For example, the depth sensing rate can be proportional to C. In another example, the depth sensing rate increases/decreases by a fixed step until the C falls below a threshold. Thus, the depth sensing rate is high enough to catch the changes on depth. In another example, the step does not have to be fixed. The rate to increase or decrease the depth sensing rate (first derivative to depth sensing rate) can be proportional to the amount of changes across a sequence of depth maps mentioned above.

In yet another example, the depth sensing rate can be different at different regions of the image. For example, for areas that have a lot of changes in a temporal sliding window, the depth sensing rate becomes higher than areas having very small changes in temporal sliding window. In another example, depth sensing rate for ROIs can be higher.

Figure 18:
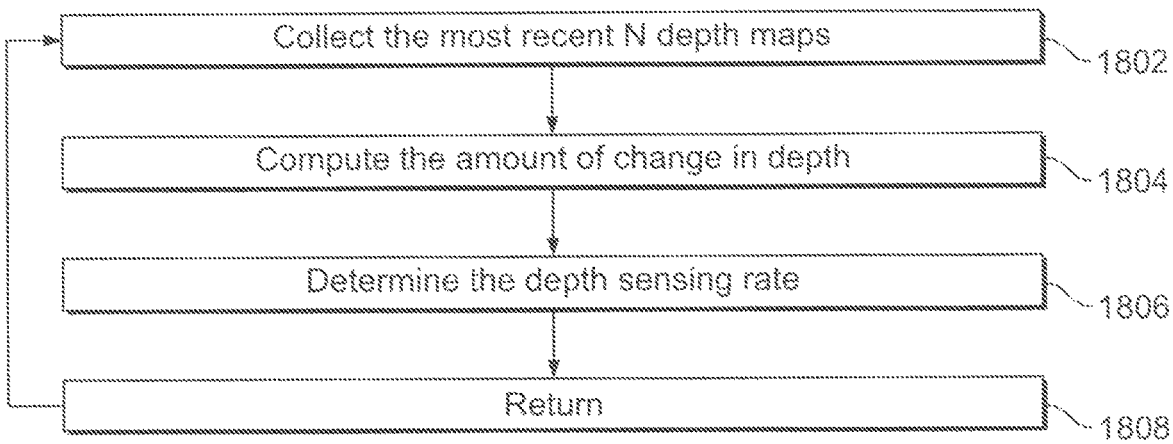
FIG. 18 is a flowchart of an example logic for adjusting depth sensing rate.

FIG. 18 is a flowchart 1800 of an example logic for adjusting depth sensing rate. The logic collects the most recent N depth maps (1802). The logic computes the amount of change in depth (1804). The logic determines the depth sensing rate (1806). The logic can return to collect most recent N depth maps and repeat the following actions, as needed (1808).

For event-triggered registration, if there is no depth change, there is no need to update the registration between two images. Although registration remains the same, the logic can update the output of registration, e.g., a visualization of superposing images, as the source images update. Registration provides a function from pixels in one image to one in the other. Similar to the adjustable depth sensing rate discussed above, the logic can determine whether the registration function should be updated. In one example, if the change on depth map, e.g., described above, goes beyond a threshold, the registration function is updated. Otherwise, the registration function can remain the same. In another example, if the change on first modality images and/or second modality images (e.g. motion), goes beyond a threshold, the registration function is updated. Otherwise, the registration function can remain the same. In yet another example, the registration function update rate can be related to the changes in depth map, changes in first modality images, changes in second modality images, or a combination thereof. In yet another embodiment, the registration function can be updated region-wise or pixel-wise, e.g., by updating the registration function for pixels within the ROIs. The actions described above to increase or decrease depth sensing rate can be used to adjust registration function update rate.

It is possible that multiple pixels (p1, p2, . . . ) in one image I1 may be registered with one pixel in the other image I2 (denoted as p0). When visualizing the registration result for source images of different resolutions, what intensity level to use for resulting pixel at p0 can be done in various ways. The logic can denote the resulting image as I3. In one example, I3(p0)=max[I1(p1), (p2), . . . ]. In another example, I3(p0)=I1($p_i$) where i=argmax [Depth(p1), Depth (p2), . . . ], meaning that $p_i$ is the deepest pixel among all pixels that can be mapped onto p0. In yet another embodiment, I3(p0) can be a weighted sum or average of intensity levels of pixels p1, p2, . . . , where the weights can be depths of pixels p1, p2, etc. All max and argmax functions used above can be replaced by min and argmin functions. Additionally, for all solutions above, the logic can multiple I2(p0) to finalize the intensity of p0 in image I3. For example, I3(p0)=I1(p0)·max[I1(p1), I2(p2), . . . ].

In some examples, the logic adjusts computation cost based on power if using a limited power source, to save power. For example, if any of the actions above are used on a device whose power source is a battery, and then any of the adjustment above can take remain battery life or computational cost into consideration. For example, if the battery is low on power, then the logic can use a lower temporal and/or spatial resolution.

Figure 19:
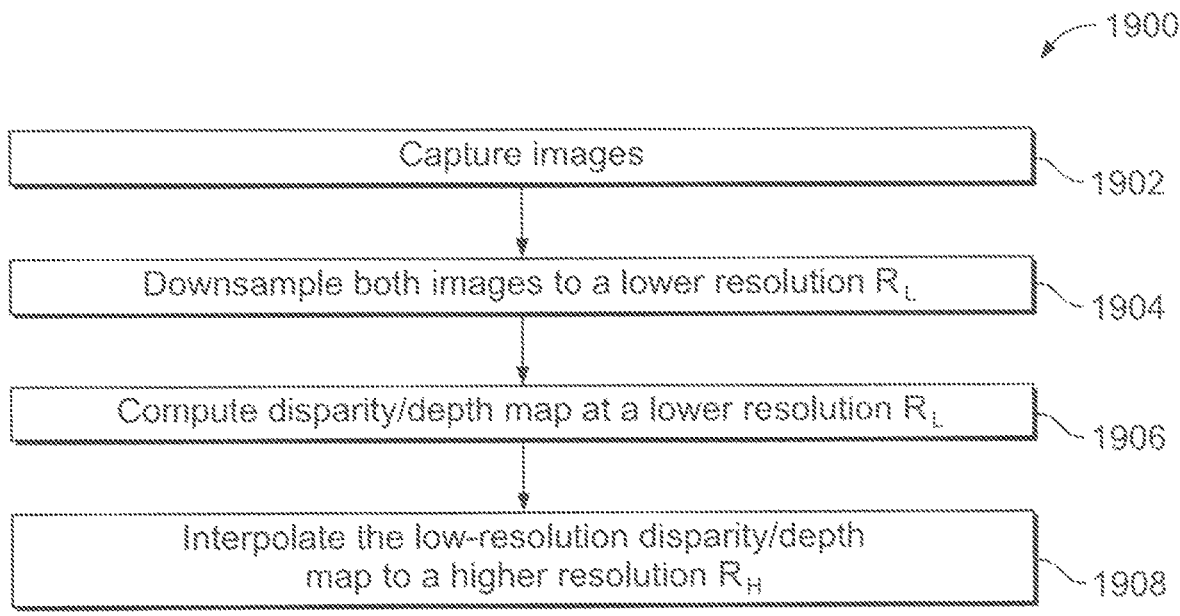
FIG. 19 is a flowchart of an example logic for using downsampled images to calculate disparity/depth map and then interpolate to higher resolution.

FIG. 19 is a flowchart 1900 of an example logic for using downsampled images to calculate disparity/depth map and then interpolate to higher resolution. The disparity/depth map calculation can be performed in downsampled images. When using a pair of camera images, e.g., two images capture from two image sensors, to estimate the disparity/depth map, both images can be first downsampled in order to reduce the computational power needed for disparity/depth map estimation. The logic can capture images, including one image from the image sensor of the first modality with resolution R1 and one from the second image sensor of the first modality resolution R2 (1902). The logic downsamples both images to a lower resolution $R_L$ (1904). The logic computes disparity/depth map at a lower resolution $R_L$ (1906). The logic interpolates the low-resolution disparity/depth map to a higher resolution $R_H$ (1908). R1 and R2 may be the same or different. $R_H$ can be the same as or different from R1 and R2.

Figure 20:
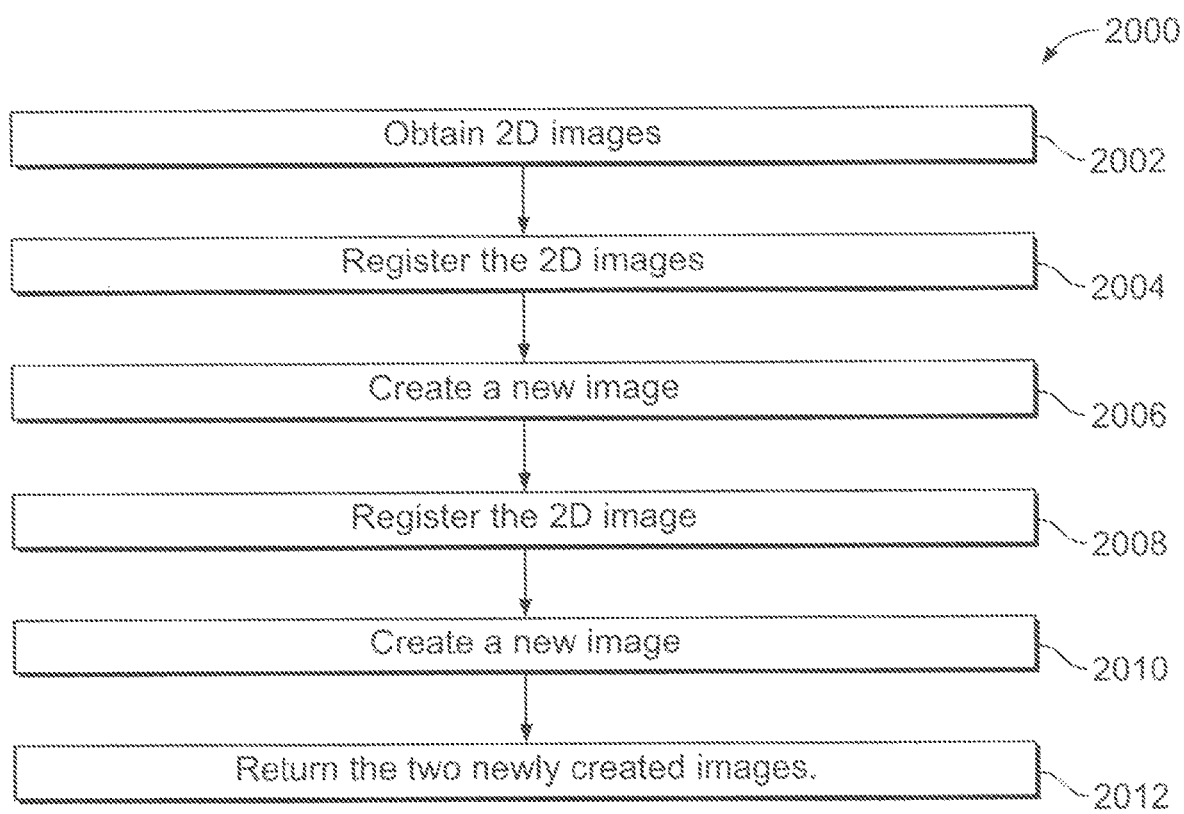
FIG. 20 is a flowchart of an example logic for turning one 2D image in the second modality into a 3D image.

FIG. 20 is a flowchart 2000 of an example logic for turning one 2D image in the second modality into a 3D image, e.g., via two images that can form a stereoscopic view of the first modality. For the sake of explanation, the first modality includes have two image sensors and the second modality includes one image sensor. By registering the 2D image in the second modality onto the images of the first modality (from the first image sensor and the second image sensor), respectively, the logic can create the stereoscopic view of the second modality, referred to as "surrogated 3D." The logic obtains one 2D image from the image sensor of the second modality, one 2D image from the first image sensor of the first modality, and one 2D image from the second image sensor of the first modality (2002). The logic registers the 2D image of the second modality with the 2D image from the first image sensor of the first modality (2004). The logic creates a new image of the second modality based on that registration (2006). The logic registers the 2D image of the second modality with the 2D image from the second image sensor of the first modality (2008). The logic creates a new image of the second modality based on that registration (2010). The logic returns the two newly created images (2012).

When the logic creates new image I, the intensity value for pixel p(x,y) is from pixel p'(x',y') in the 2D image of the second modality where p'(x',y') is registered with pixel p(x,y) in the image of the first modality. In other words, to create the new image, the image of the first modality determines the pixel indexes, which corresponds to stereoscopic effect, while the image of the second modality determines the intensity values of pixels, which corresponds to information specific to the second modality. For example, the fluorescence image only shows objects that are fluorescent, not objects that are not fluorescent, even if they exist. Mathematically, $I(x,y)=I'(x',y')$ such that $f(p''(x,y))=p'(x',y')$, where I is the newly created image, I' is the image of the second modality, p' is a pixel in the image of the second modality, p'' is a pixel in the image of the first modality, and f is the registration function from the image of the first modality to the image of the second modality. Because the two images of the first modality can form a stereoscopic view, by registering and transferring the image of the second modality to them, the logic can create a stereoscopic view in the second modality. The registration can use actions described herein, any existing image registration method, or a combination of all image registration methods. In one example, the first imaging modality is color imaging and the second imaging modality is thermal imaging, and the logic can create a stereoscopic view in thermal imaging. In another example, the first imaging modality is color imaging and the second imaging modality is hyperspectral imaging, and the logic can create a stereoscopic view in hyperspectral imaging.

Figure 21:
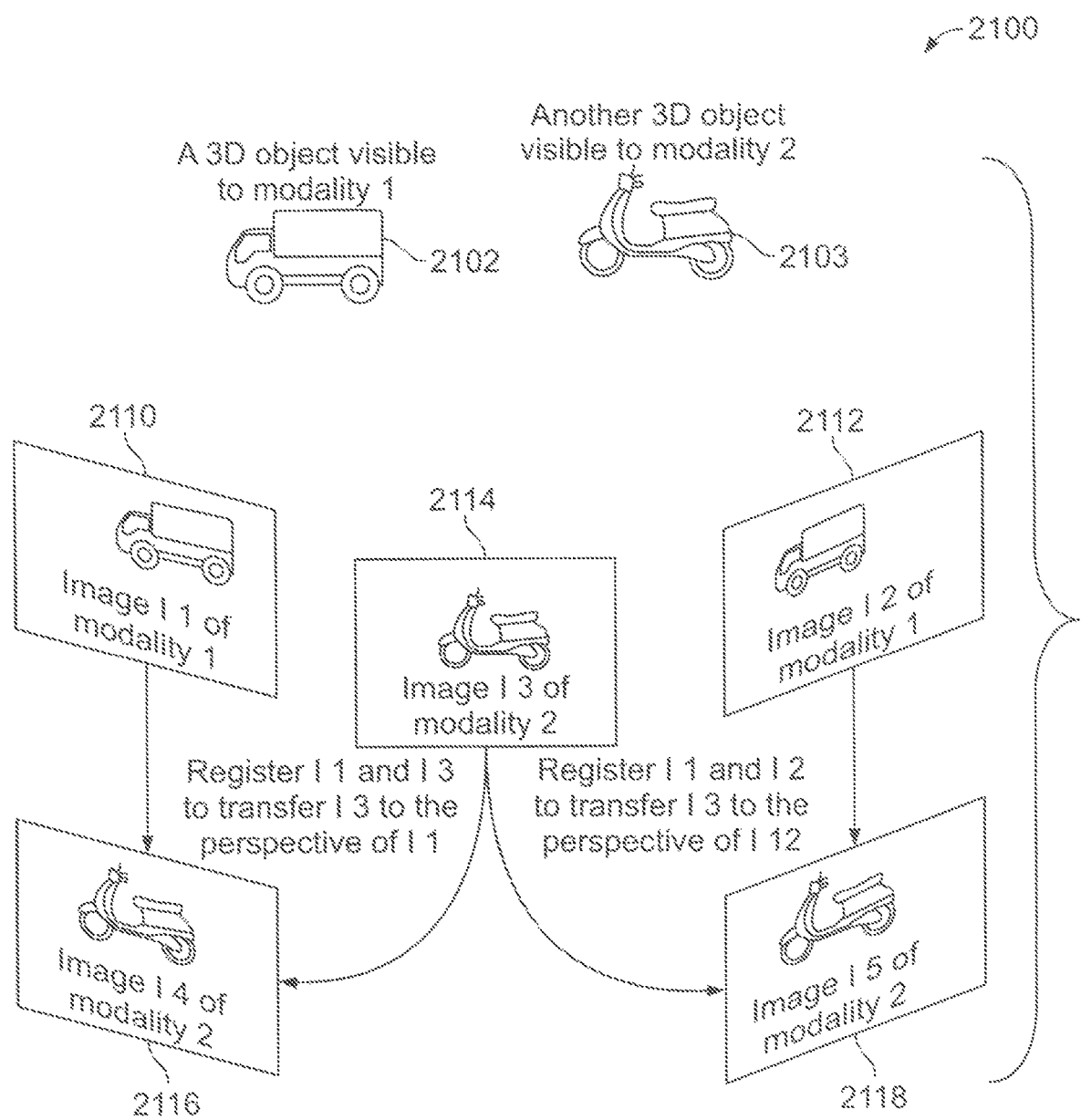
FIG. 21 is a block diagram of an example environment for imaging 3D objects.

FIG. 21 is a block diagram of an example environment 2100 for imaging 3D objects. For the sake of explanation, the image capturing device 102 captures images from a first 3D object 2102, e.g., visible to a first modality, and a second 3D object 2103, e.g., visible to a second modality. In this example, the image capturing device 102 captures image I1 (2110) of modality 1, image I2 (2112) of modality 1 and image I3 (2114) of modality 2. The logic can register I1 and I3 to transfer I3 to the perspective of I1, to provide image I4 (2116) of modality 2. The logic can also register I1 and I2 to transfer I3 to the perspective of I2, to provide image I5 (2118) of modality 2. By registering the 2D image in the second modality onto the images of the first modality, respectively, the logic can create the stereoscopic view of the second modality, even if the second modality only has one image sensor that can otherwise only form a 2D image.

Figure 22:
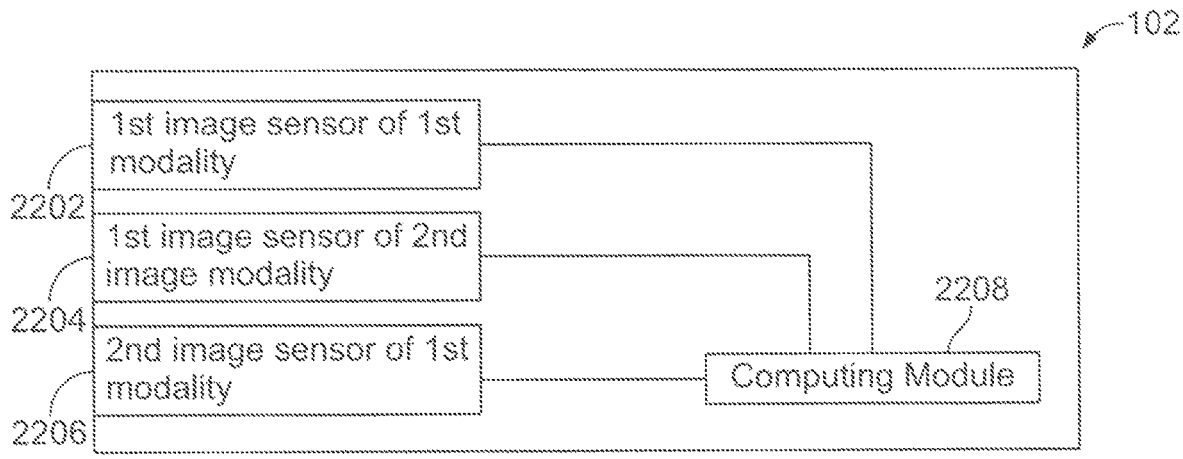
FIG. 22 is a block diagram of another example image capturing device.

FIG. 22 is a block diagram of another example image capturing device 102. In some examples, the image capturing device 102 includes three sensors 1-A 106, a first image sensor of the first modality 2202, an image sensor of the second imaging modality 2204 and a second image sensor of the first modality 2206. Image sensors 2202, 2204, 2206 are sensors that can capture an image with more than one pixel. One or more image sensors 2202, 2204, 2206 can capture spatial information about the parameter being sensed, e.g., light, sound, etc. A non-imaging sensor being used in conjunction with a scanning mechanism, e.g., raster scanning, can produce an image, and such systems are considered image sensors. The image sensors 2202, 2204, 2206 can be spread over one or multiple image capturing devices 102.

In some examples, the image sensor 2202, 2204, 2206 can include one or more charge-coupled device (CCD) sensor, complementary metal-oxide-semiconductor (CMOS) sensor, a plurality of photodiodes, a plurality of phototransistors, photomultiplier tubes (PMT) arrays, one or more single-photon avalanche diodes (SPDs) and/or one or more avalanche photodiodes (APDs), etc. The system can use one or more of passive, e.g., receiving signal only, e.g., a camera without a flashlight, and active sensors, e.g., transmitting signal and then receiving signal, e.g., a camera with a flashlight. In some examples, a passive and/or active sensor can serve the function as a slave or master sensor.

The image sensors 2202, 2204, 2206 can connect with a computing module 2208, e.g., for controlling operation of the image sensors 2202, 2204, 2206 and/or processing data collected by the sensors 2202, 2204, 2206. In some examples, the computing module 2208 converts the data from master sensors into commands to control the slave sensors. The computing module can be implemented in various ways, e.g., microcontrollers, central processing units (CPU), graphics processing units (GPU), field-programmable gate arrays (FPGA), or a combination of one or more of them. The computing module 2208 can also include a memory unit and local storage. The computing system 2208 can be local or distributed, e.g., part of the computation done on the embedded computer in an active sensing system with processing and/or memory located on a cloud-based server. The computing module 2208 can run software that performs one or more of the coregistration, e.g., described herein. In some examples, a dedicated integrated circuit, e.g., application-specific integrated circuit (ASIC) can be used to coregister the images of the first modality to the images of the second modality. The ASIC can communicate with the computing module 2208 in various ways, including inter-integrated circuit (I2C) and Serial Peripheral Interface (SPI).

Figure 23:
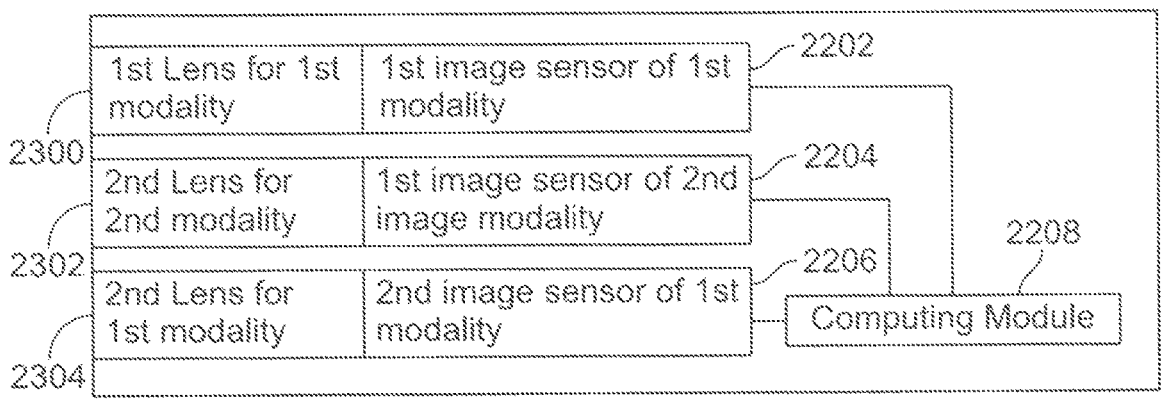
FIG. 23 is a block diagram of another example image capturing device.

FIG. 23 is a block diagram of another example image capturing device 102. In some examples, the image capturing device 102 includes one or more lens, e.g., a first lens 2300 for the first modality, a lens 2302 for the second modality and a second lens 2304 for the first modality. In some examples, there is one lens for every sensor, but multiple sensors can share lenses in other examples. In other examples, the image capturing device 102 does not include any lenses, and only uses pinholes. In other examples, the image capturing device 102 includes a combination of lenses, no lenses and/or pinholes.

Figure 24:
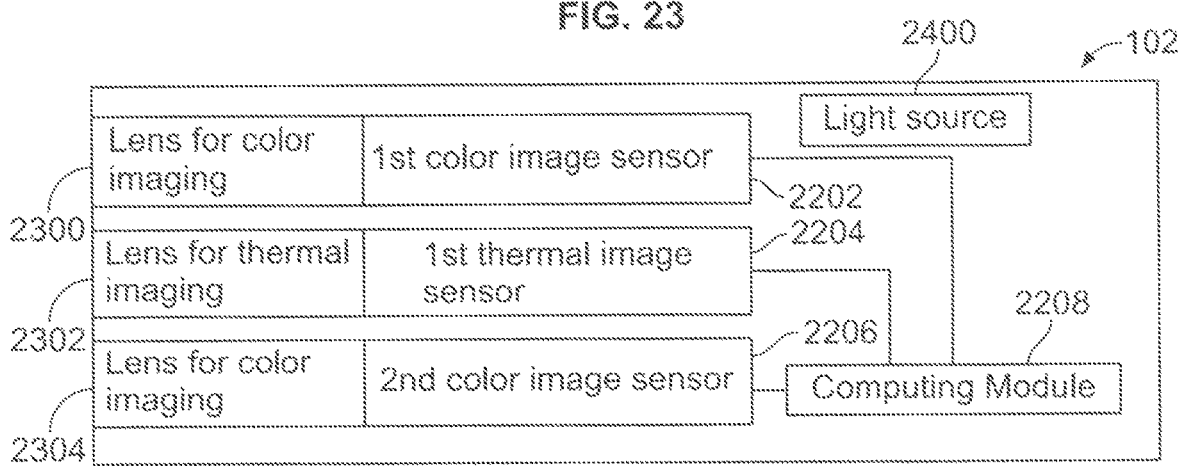
FIG. 24 is a block diagram of another example image capturing device.

FIG. 24 is a block diagram of another example image capturing device 102, e.g., for color and thermal imaging system with co-registration. The image sensors 2202, 2204, 2206 can include image sensors of the first imaging modality as color image sensors, e.g., color CMOS or CCD sensors, and image sensor of the second imaging modality as a thermal image sensor. The color and thermal image sensors may be used in conjunction with color and thermal imaging lenses 2300, 2302 and 2304, respectively. In addition, other optical components, e.g., flat or spherical mirrors, may be used to reflect light and fold the optical pathway.

The thermal image sensor, as the second modality can capture thermal information, e.g., hot/cold objects. For example, living things e.g., wildlife or people, can be easily identified. As the resolution of thermal imaging is typically lower than that of color imaging and the cost of thermal camera is typically higher than that of color cameras, the system can use the co-registered thermal and color images to provide a high resolution overlaid image of thermal and color information. The logic described above can be applied to handle the different resolutions between color and thermal images. Also, the color sensor can provide complementary information to the thermal sensor. For example, using the system that performs coregistration, users can better survey the heat profile of their homes. The color information can provide structural cues to the user that allow the user to better comprehend the thermal information. This provides a way to enable concurrent thermal-color coregistered imaging. In another example, the coregstration need not be visible to a human. Instead, the color images, thermal images and coregistration data are feed are used for additional computer vision analysis. For example, the computer vision can use the coregistration data, and color and thermal images to detect obstacle for used for steering a vehicle and/or in conjunction with an automatic breaking system, etc. In some examples, the vehicle is an autonomous, e.g., self driving, or partially autonomous, vehicle.

The thermal image sensor may include cooled or uncooled infrared image detectors. In some examples, the thermal image sensor is a microbolometer. The thermal image sensor may be based on one or more of the following types of materials, including but not limited to, indium antimonide, indium arsenide, mercury cadmium telluride, lead sulfide, lead selenide, amorphous silicon, vanadium oxide, lanthanum barium manganite (LBMO), lead zirconate titanate (PZT), lanthanum doped lead zirconate titanate (PLZT), lead scandium tantalate (PST), lead lanthanum titanate (PLT), lead titanate (PT), lead zinc niobate (PZN), lead strontium titanate (PSrT), barium strontium titanate (BST), barium titanate (BT), antimony sulfoiodide (SbSI), polyvinylidene difluoride (PVDF), etc. It should be appreciated that the thermal image sensor can image Mid-Wave Infrared (MWIR) or/and Long-Wave Infrared (LWIR) light, which are emitted from the objects themselves to infer the temperature of the objects.

In other examples, the system includes one or more light sources 2400 to provide illumination to the subjects 104 being captured. In one example, the light source includes LEDs. The LEDs can be white LEDs and/or color LEDs to provide a good illumination for the objects of interest. The light sources may include reflectors and/or lenses, or other optical components, as necessary. In other examples, the light source can include a diffuser. Additionally or alternatively, the light source may include a laser light, e.g., a laser diode, a light emitting diode (LED), e.g., a white LED, an incandescent light, a superluminescent diode, a projector lamp, an arc-lamp, e.g., xenon, xenon mercury, or metal halide lamp, as well as coherent and/or incoherent light sources. In another example, the light sources come with optical components e.g., varifocal lens or a mechanical sliding mechanism, to allow the system to adjust the relative position of the lamp/LED and reflector using the actuators.

In other examples, the light source 2400 is modularly constructed and can be physically removed from the image capturing device 102. The light source 2400 can be placed at different locations from the other part of the image capturing device 2400, to provide illumination from various angles with respect the sensors 2202, 2204 and 2206. The light source 2400, when physically removed from the image capturing device 102, can maintain a communication connection with the computing module 2208, in a wired manner or wireless manner for the computing module 2208 to control the illumination from the light source 2400. In some examples, the light source 2400 is a flash, which can be used on the image capturing device 102 or off. In other examples, the light source 2400 is a constant light source. The computing module 2208 may include one of computing units, part of which may be connected with the light source 2400. In some aspects, when the light source 2400 is physically removed from other parts of the image capturing device 102, a subset of the computing units of the computing module 2208 are disconnected from the other parts of the image capturing device 102, but still connected to the light source 2400 to control and light source.

Figure 25:
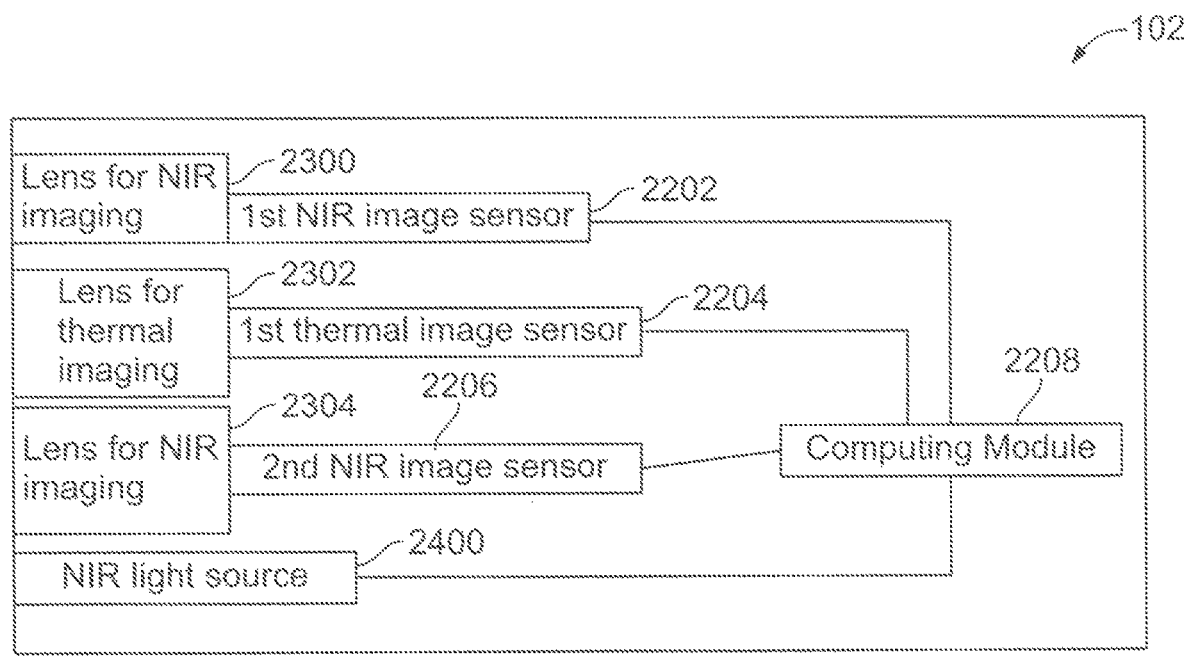
FIG. 25 is a block diagram of another example image capturing device.

FIG. 25 is a block diagram of another example image capturing device 102, e.g., including two near-infrared (NIR) sensors 2202, 2206 co-registered with one thermal image sensor 2204. The (NIR) image sensors 2202, 2206 can include, one or more of monochrome CMOS or CCD sensors. The NIR sensors 2202, 2206 and thermal image sensor 2204 can be used with NIR and thermal imaging lenses 2300, 2302, 2304, respectively. In addition, the image capturing device 102 can use other optical components, e.g., flat or spherical mirrors, to reflect light and fold the optical pathway. Additionally, the image capturing device 102 can be used with one or more NIR light sources 2400, e.g., NIR LEDs, filtered lamps, laser diodes, and/or laser, to illuminate the subjects 104 within the field of view (FOV) of the NIR imagers 2202, 2206. The NIR image sensors 2202, 2206, e.g., as the first modality, can capture NIR light, e.g., NIR light reflected off the objects. In some examples, the image capturing device 102 can be used for security purposes, e.g., to provide NIR-thermal security monitoring with both NIR and thermal images coregistered. In another examples, the image capturing device 102 can be used to generate coregistration for computer vision analysis. Computer vision analysis may be used for obstacle detection at night, and it may be used as inputs to logic to steer vehicles and/or for automatic breaking systems, etc.

For example, night vision can be implemented using both NIR imaging and thermal imaging, and living things e.g., wildlife or people can be easily identified. As the resolution of thermal imaging is typically lower than that of NIR imaging and the cost of thermal camera is typically higher than that of NIR cameras, co-registering thermal and NIR images can provide a high resolution overlaid image. The thermal imager also provide a longer imaging range than NIR camera for night vision, as the NIR light source has a range of illumination. Also, the color and NIR sensor can provide complementary information. For example, using coregistration, the user can have better night vision and/or security surveillance capabilities. The NIR information provides better structural cues to the user that allow the user to better comprehend the thermal information, to enable better security or night vision. This provides a way to enable concurrent thermal-NIR coregistered imaging. In another example, computer vision analysis based on concurrent thermal-NIR coregistered imaging can better detect obstacles that can facilitate the steering and/or control of a ground vehicle, aerial vehicle, water based vehicle, robots, etc.

In some examples, the NIR camera can be replaced with other sensors, including but not limited to a short-wave infrared (SWIR) camera to image short-wave infrared light. In that case the NIR light source is replaced with a SWIR light source. Additionally or alternatively, Terahertz imaging can be used as the second imaging modality with one terahertz image sensor, to register with NIR images or color images as the first imaging modality.

In some examples, the first modality image sensor can be used both for color imaging and NIR imaging. The image sensor of the first modality can include CCD or CMOS image sensors that have pixelated filter arrays, e.g., Bayer filter array, but without a NIR cut glass/filter. These sensor can be used for color imaging during the day, but also can be used for night vision and security during the night. When the surrounding environment is bright, e.g. daytime or with illumination, the system can perform color-thermal coregistered imaging. When the surrounding environment is dark, e.g. nighttime, or without illumination, the system can perform NIR-thermal coregistered imaging to enable dual-modal night vision.

In another example, the image sensors of the first imaging modality are color image sensors, and the second modality is thermal imaging. The color image sensors can include mechanically removable NIR cut filters that can be placed in front of sensors upon command, e.g., via an actuator that moves the NIR cut filters into and out of the light path leading to the color image sensors. The NIR cut filters can be placed in the light path to enable better color imaging without color distortion. The NIR cut filters are removed from the light path to enable sensitive NIR night vision. The activation of NIR cut filter placement can be manual and/or programmed, e.g. to actuate during a time frame, e.g., 6 am-7 pm, etc., and/or sensor controlled. For example, an ambient light sensor can sense a low light level and trigger the removal of the NIR cut filter from the light path, and/or can be controlled by machine learning and computer vision (CV).

In some examples, the image sensors of the first imaging modality are color image sensors, e.g., color CMOS or CCD sensors, and the image sensor of the second imaging modality is a NIR image sensor. The color and NIR image sensors can be used in conjunction with lenses. In addition, other optical components e.g., flat or spherical mirrors, may be used to reflect light and fold the optical pathway. The system can further include one or more NIR light sources. The system can enable near-infrared and color co-registered imaging. Two NIR image sensors can be used as the first modality and one color image sensor may be used as the second modality.

In some examples, the image sensors of the first imaging modality are color image sensors and the image sensor of the second imaging modality is a narrow band imaging camera. In some examples, the narrow band imaging camera includes an imaging sensor, an lens and an narrow band filter. The filter can include, for example, band-pass, long-pass and/or short-pass filters. In addition, other optical components e.g., flat or spherical mirrors, may be used to reflect light and fold the optical pathway. The system may further include one more light sources. The light sources may be filtered by bandpass filters, short-pass filters and/or long-pass filters. Additional or alternative to color imaging, the first modality can provide reflectance imaging with monochrome image sensors.

In some examples, the narrow band imaging system is configured to be a fluorescence imaging system, e.g., as the second imaging modality. In some examples, the fluorescence imaging system includes an excitation light source with excitation filter, two color imaging sensors, one image sensor for fluorescence imaging, an emission filter and lenses. The fluorescence image sensor can be coupled to a lens and an emission filter. The emission filter can be band-pass filter or long-pass filter, for example. In some examples, the color sensors are further coupled with band-rejection filters that blocks the spectra of the fluorescence emission. For example, if emission is peaked at about 830 nm, the band-rejection filter can reject the 830 nm band, so that the color image sensors only capture reflection but not fluorescence. In other examples, the system may further include white light sources for illumination of objects for color reflectance imaging. As described above, the fluorescence and color reflectance images can be overlaid and 3D effect with depth perception can be produced. The acquisition of the system can be interleaved. For example, if both the color image sensor and fluorescence image sensors are operating at 30 frame-per-second, with their clocks synchronized, odd frames 1, 3, 5, 7, 9 . . . , 29 can be used for color imaging, and even frames 2, 4, 6, 8, 10, . . . , 30 can be used for fluorescence imaging. The excitation light sources and/or white light sources can be synchronized with the image sensors for interleaved imaging. The image frames from color imaging and image frames from fluorescence imaging can be registered, e.g., with a small temporal offset. In some examples, instead of color imaging, the first modality can be reflectance imaging with monochrome image sensors. The fluorescence and reflectance images can be registered to provide complementary information.

The choice of the first imaging modality and choice of the second imaging modality can include of various possibilities. In some examples, the first imaging modality can be color imaging, reflectance imaging (e.g., monochrome image sensors), or NIR imaging or any other modalities, and the second imaging modality can be hyperspectral imaging, oxygen saturation imaging, imaging using a transillumination geometry, imaging of absorption and scattering coefficient, etc.

In some examples, there are more than two image sensors of the first imaging modality. For instance, there may be three or more image sensors for the first imaging modality. This may be beneficial for some cases, given that more image sensors can obtain a larger range of depth information. If image sensors one, two and three of the first imaging modality are horizontally placed with image sensor two in the middle, the depth information calculated from image sensor one and two can cover different ranges from the depth information calculated from image sensors one and three.

In some examples, there may be more than two imaging modalities. For example, there can be a third imaging modality of another sensor. Therefore, the imaging modality two and three can be both registered to imaging modality one. For example, the system can implement color/thermal/NIR tri-modal coregistered imaging, or color/fluorescence/narrow band tri-modal coregistered imaging.

Figure 26:
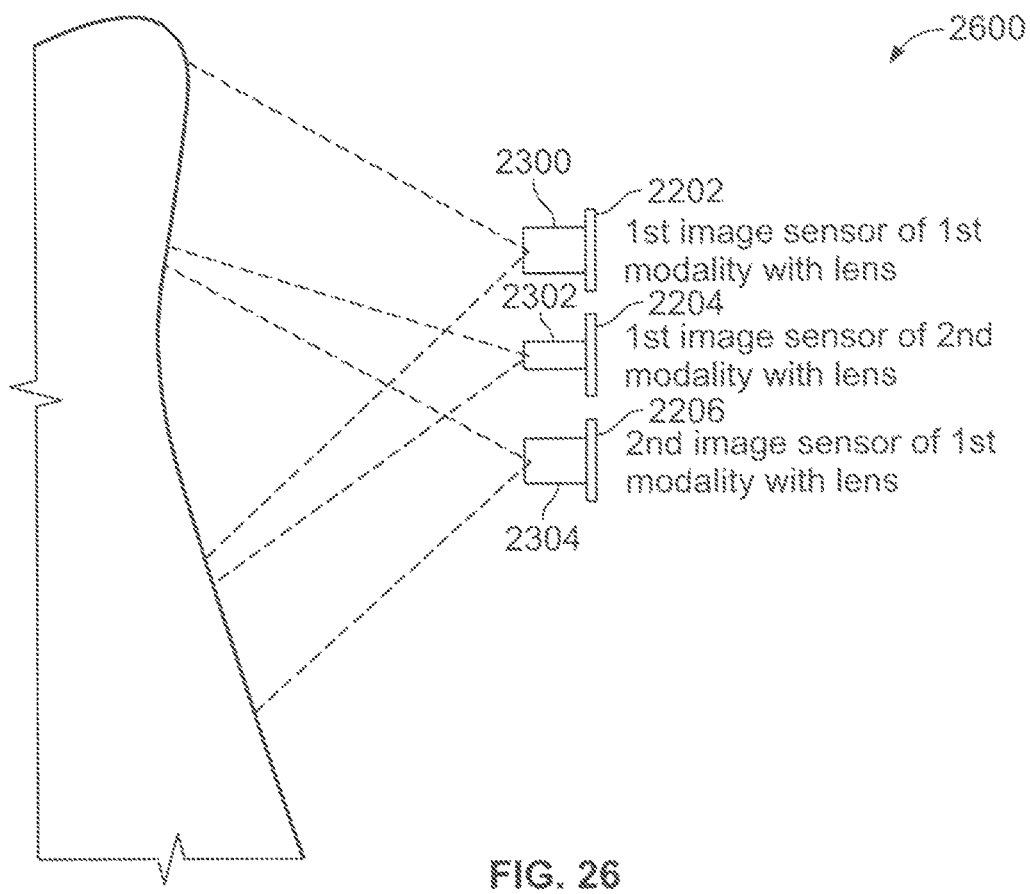
FIG. 26 is a block diagram of a side view of an example configuration of the image sensors.

FIG. 26 is a block diagram of a side view of an example configuration 2600 of the image sensors 2202, 2204, 2206. With regard to the placement of the sensors, in one example, the image sensor 2204 of the second modality can be positioned in the middle of two image sensors 2204, 2206 of the first imaging modality. This can be advantageous because the field-of-view of the image sensor 2204 of the second modality can provide a good overlap with the common field of view of the image sensors 2202, 2206 of the first modality, e.g., described as the overlapping area of the field of view between the first image sensor 2202 and the second image sensor 2206 of the first modality. Objects within the common field of view of the first modality can be provided with good z information for registration. This configuration can be advantageous, allowing a better image performance and a smaller device size than other arrangements. In some examples, the image sensors 2202, 2206 and lenses 2300, 2304 of the first modality are the same type, e.g., same product or specifications, allowing easier calibration and computation.

Figure 27:
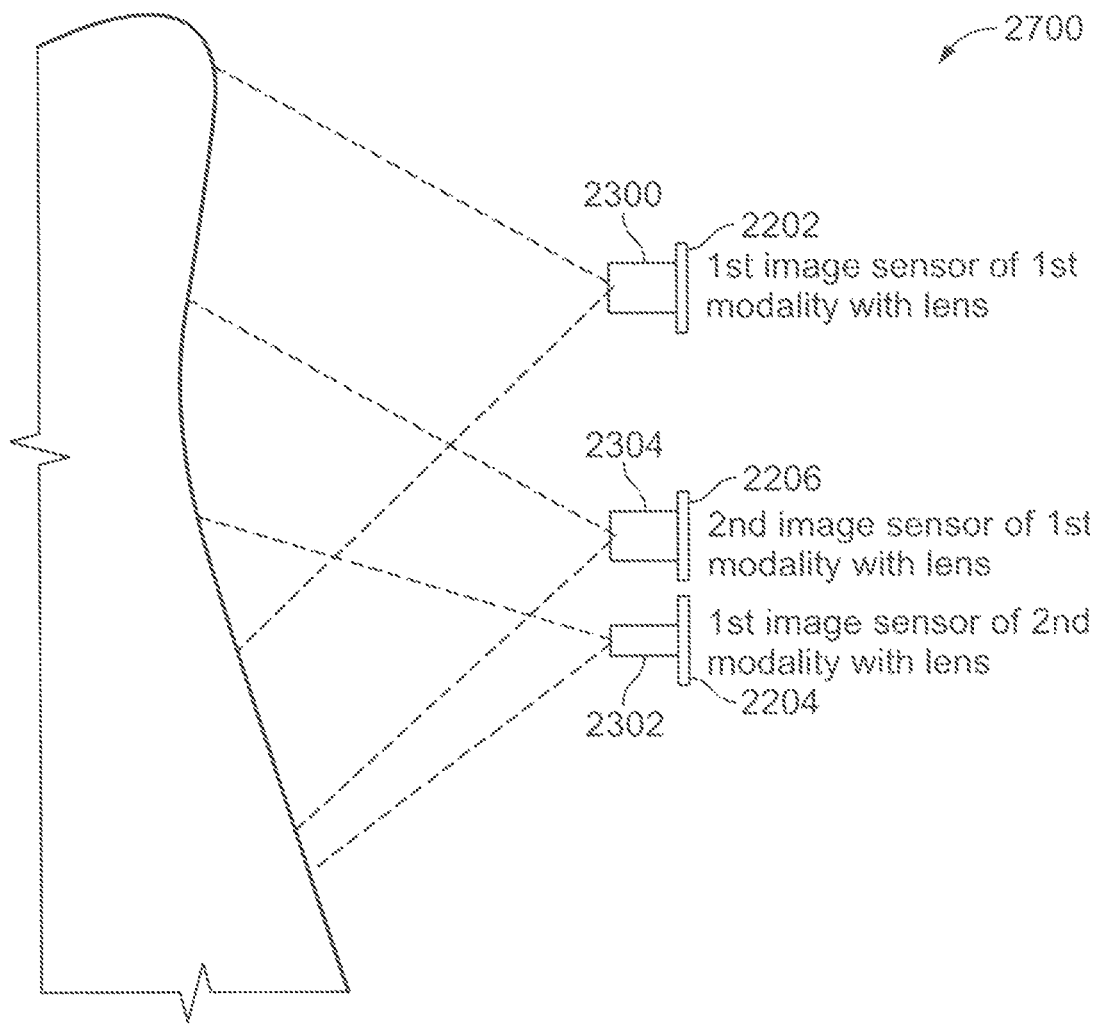
FIG. 27 is a block diagram of a side view of another example configuration of the image sensors.

FIG. 27 is a block diagram of a side view of another example configuration 2700 of the image sensors 2202, 2204, 2206. In some examples, the image sensor 2204 of the second modality can be on the side to the two image sensors 2202, 2206 of the first imaging modality. This configuration can be desirable when the image sensor 2204 and lens 2302 of the second modality is big and exceeds the inter-sensor separation distance of the two sensors 2202, 2206 of the first modality.

Figure 28:
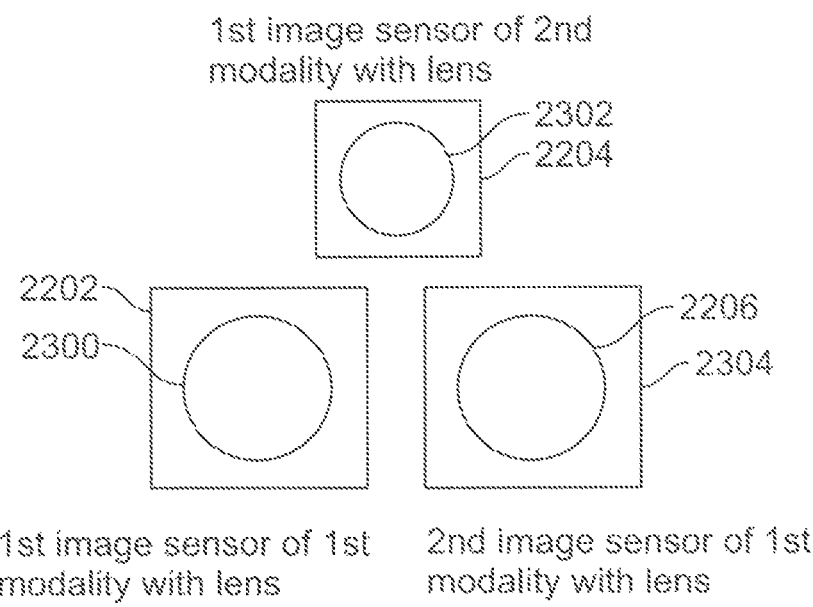
FIG. 28 is a block diagram of a front view of another example configuration of the image sensors.

FIG. 28 is a block diagram of a front view another example configuration 2800 of the image sensors 2202, 2204, 2206. In some examples, the images sensors 2202, 2206 of the first modality and the image sensor 2204 of the second modality are arranged so that the image sensor 2204 of the second modality is placed at a higher position than the image sensors 2202, 2206 of the first imaging modality.

With any of the configurations above, in some examples, the image sensors 2202, 2206 of the first imaging modality are coplanar. This can be advantageous because of easiness of manufacture and fabrication. In some examples, the image sensor 2204 of the second imaging modality can also be coplanar with the image sensors 220, 2206 of the first modality. This way the manufacture and calibration may be easy to perform. In some examples, the image sensor 2204 of the second imaging modality can be positioned in a different plane (Plane 2), where Plane 2 is in parallel with the plane situated the image sensors 2202, 2206 of the first modality (Plane 1). This configuration can save spaces for the image sensor and allow a smaller footprint for the apparatus.

In some examples, the image sensors 2202, 2206 of the first modality are positioned in a converging way. For example, a plane of the image sensor 2202 and the plane of the image sensor 2206 form an angle less than 180 degrees. In another example, the image sensors of the first modality are placed in a diverging way. For example, the plane of the image sensor 2202 and the plane of the image sensor 2206 form an angle more than 180 degrees. In another example, the image capturing device 102 further includes actuators, motors and/or wheels that can move one or more cameras and/or lenses. In some examples, the actuators/motors/wheels can adjust the inter-sensor distance between the image sensors 2202, 2206 of the first imaging modality.

Figure 29:
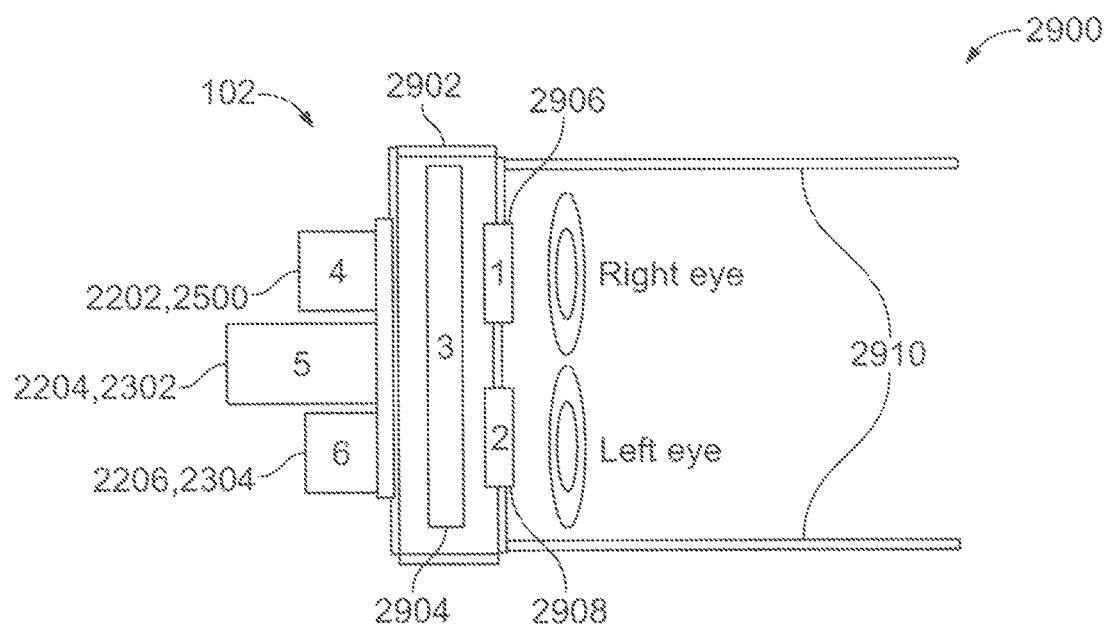
FIG. 29 is a block diagram of a cross-section view of an example image capturing device.

FIG. 29 is a block diagram of a cross-section view of an example image capturing device 102 for virtual reality (VR) and/or augmented reality (AR). In some examples, the image capturing device 102 can include a display module 2900, image sensors 2202, 2206 of the first imaging modality, the image sensor 2204 of the second imaging modality, lenses 2300, 2302, 2304 and computing module 2208. In some examples, the display module 2900 includes a case 2902 to provide a headset to enable virtual reality. In some examples, the case 2902 can house a mobile device 2904. In some examples, the display module 2900 can include a magnifier for right eye 2906, a magnifier for left eye 2904 and/or a head strap 2910. In some examples, the image sensors are built as an imaging module, which can be removed from the other part of the display module 2900. The mobile device 2904 can execute software to split the screen into left portion and right portion. The mobile device 2904 can display left images in the left portion of the display for the left magnifier 2908, to be viewed by the left eye of the user. The mobile device 2908 can display right images in the right portion of the display for the right magnifier 2906, to be viewed by the right eye of the user. The magnifiers can have one or more lenses, e.g., convex lenses. When the image capturing device 102 is removed, the display module 2900 can function as a regular VR or AR phone case. In some examples, the display module 2900 can include a mechanical lock or other mechanism to facilitate docking and removal of the imaging module from the rest of the display module 2900. In some examples, the display module 2900 can be in the form of glasses or goggles.

In some examples, the display module 2900 includes one or more of a liquid crystal on silicon (LCoS) display, a liquid crystal display (LCD) display, an OLED (organic light emitting diode) display, a projection display, a digital projector, a digital projector with a partially transparent mirror, a head-mounted projection display (HMPD), an optical-see through display, a selective occlusion see-through head-mounted display, a video see-through display, and/or a head-up display (HUD), etc. The display module 2900 can include an augmented reality window, augmented monitors, selective occlusion see-through head-mounted display, a retinal scanning display, and/or any other suitable display. The display module 2900 can include a picture-in-picture (PIP) display that can display images from multiple independent image sources simultaneously. In some examples, the display module 2900 can provide a transparent or partially transparent display unit, e.g., transparent OLED display, or can be a display unit with reflective surfaces, e.g., a digital projector with a partially transparent mirror/glass. The display module 2900 may be configured in a head-mounted display (HMD) configuration or a head-up display (HUD) configuration. The display module 2900 may be stereoscopic or non-stereoscopic. The display module 2900 can be optical see-through or not optical see-through.

The image capturing device 102 can capture images from the first and second modalities, coregister the images from the first modality and second modality, and enable 3D visualization of the second modality using the surrogated 3D logic described above. Similarly, 3D visualization of overlaid images of the first and the second modality can also be enabled using the surrogated 3D logic described above. The 3D effects can be created for the second modality even if only one image sensor of the second modality is used, instead of two image sensors of the second modality that are normally needed. In examples when the image systems of the second modality is expensive and/or need bulky instrumentation, e.g., thermal imaging, hyperspectral imaging, fluorescence imaging etc., this can be advantageous. Also, if the first imaging modality is color or NIR imaging, the image components of the first imaging modality can be smaller than that of the second imaging modality. Therefore, smaller systems can be manufactured.

In some examples, the first imaging modality is color imaging and the second modality is thermal imaging. The image capturing device 102 can provide thermal 3D VR/AR. The thermal images can be optionally overlaid on the color images to provide an enhanced visualization experience. In another example, the first imaging modality is NIR imaging and the second modality is thermal imaging. The image capturing device 102 can provide thermal 3D VR/AR or 3D VR/AR for concurrent NIR and thermal night vision. The thermal images can be optionally overlaid on the NIR images to provide an enhanced visualization experience. In another example, the image sensors of the first modality are color sensors with removable NIR cut filters, and the second imaging modality can include thermal imaging using one thermal image sensor. Therefore, the image capturing device 102 can provide VR/AR with 3D thermal image visualization, along with color or NIR imaging. Example implementations include systems for hunting, security, industry inspection and/or for hobbyist purposes, etc. In some examples, the first imaging modality is color imaging and the second modality is fluorescence imaging. The image capturing device 102 can provide fluorescence 3D VR/AR. The fluorescence images can be optionally overlaid on the color images to provide an enhanced visualization experience.

In some examples, the image sensors of the first and second modality are physically separated from the display module 2900. For example, the image sensors can be located at Palo Alto, Calif. and the display module can be located at Seattle, Wash., but the modules can work together by using internet or wired/wireless communication to transfer data and enable remote VR/AR experience. The image capturing device 102 can be configured as a night vision goggles or security scopes. The image capturing device 102 can be used for hunting, searching for wildlife and animals or tactical/military purposes.

In some examples, the image capturing device 102 is embodied as a baby monitor or a child monitor. In some examples, the baby monitor includes two sensors 2202, 2206 of the first imaging modality, one image sensor 2204 of the second imaging modality, lenses 2300, 2302, 2304, actuators/motors, microphones, light sources, speakers and a communication module 118. The baby monitor may further include actuators/motors that can rotate or move the baby monitor and/or light sources. In some examples, the first imaging modality may be color imaging and second imaging modality can be thermal imaging. The image sensors 2202, 2206 of the first modality can capture color images and the image sensor 2204 of the second modality can capture thermal images. The color and thermal images can be coregistered, e.g., as described above, to display, e.g., to a user. The system can display the data locally or remotely using a monitor, phone, tablets and/or computers, etc. The registering logic may run locally, on the server or on the phone, allowing easy visualization. The thermal imaging can provide additional information than the typical color camera based monitors. The computing module 2208 registers the images of the first and second modality, and may analyze the thermal images of the baby using computer vision algorithms to identify specific events, e.g. baby is not breathing, baby is kicking the comforter off, baby is rolling over, baby's diaper has fluid, child is running around, child is on the floor, etc., based on the thermal signatures. Alternatively, computer vision analysis can be performed based on both thermal and color images to achieve better results.

The communication module 118 provides for wired and/or wireless communication with other computers/smartphones/tablets or monitors, for the control and display, e.g., by the parents/users.

In another example, the first imaging modality is NIR imaging. In some examples, the image sensors of the first imaging modality are monochrome image sensors and the light source are NIR LEDs. The system can provide coregistered NIR images, which enable night vision, and thermal images.

In another example, the image sensors of the first imaging modality are color image sensors, and the second modality is thermal imaging. The color image sensors can include mechanically removable NIR cut filters that can be placed in front of sensors upon command. The system can coregister color imaging, NIR imaging and thermal imaging.

In some examples, image capturing devices 102 with co-registered images can interface with robots, vehicles, unmanned aerial vehicles (UAVs), airplanes, ships, etc. In other examples, the system includes an interface to connect to robots, vehicles, UAVs, airplanes, ships, etc., to be used in conjunction with robots, vehicles, UAVs, airplanes, ships, etc. The communication module 118 can provide wired and/or wireless connection between the apparatus and the robots, vehicles, UAVs, airplanes, ships, etc. In other examples, the system can include a mechanical mount for the image capturing device 102 to physically attach to the robots, vehicles, drones, airplanes, ships, etc.

In another example, the system further includes a robot, a UAVs, an airplane, a helicopter, a ship, a military vehicle, e.g., a tank, other vehicles, etc. In some examples, the image capturing device 102 is a robot, a vehicle, a UAVs, an airplane, a ship, etc., with multimodal coregistered imaging capability. In some examples, the components of first imaging modality and second imaging modality are designed as built-in components of a robot, a vehicle, a UAVs, a helicopter, an airplane, a ship, a military vehicle, e.g. a tank, etc. In some examples, the image capturing device 102 includes a robot for food industry, e.g., providing thermal information and color information. Computer vision analysis can be performed on thermal and color images that are registered. The image capturing device 102 can also include a robot that collaborates with humans, e.g., to understand where people are so that robots do not injure the people. The image capturing device 102 can provide joint thermal-color image analysis, which can lead to better localization of people, live animals, other vehicles, obstacles, etc. In some examples, the image capturing device 102 includes, or assists, driving and self-driving of vehicles.

In some examples, the image capturing device 102 provides an interface to connect to weapons, e.g., guns, rifles, cannons, etc. The image capturing device 102 can be used in conjunction with weapons for aiming purposes. The interface may allow wired and/or wireless connection between the image capturing device 102 and the weapons. There may also be a mechanical mount for the image capturing device to physically attach to the weapons. The image capturing device 102 may guide visualization and/or automatically aiming of the weapons.

In some examples, the image capturing device 102 can be used with mobile devices, e.g., smartphones and tablet computers, etc. In some examples, the image capturing device 102 can be connected or docked to the smartphone in a wired fashion via the micro-universal serial bus (USB), mini-USB, Apple Lightning connector socket, or any other connector data socket on the phone or tablet computers, etc. In some examples, the image capturing device includes a mechanical mount that can mechanically attach the apparatus to the smartphone/tablet.

In some examples, the image capturing device 102 can include a mobile device case module. The mobile device case module can be made of rubber, which houses both the mobile device and the image capturing device 102. In some examples, the mobile device case module can be removed from the image capturing device 102. The mobile device case can serve as a regular phone case for the phone, for example, while the image capturing device 102 can be docked onto the mobile device case module, allowing electrical and/or mechanical integration between the image capturing device 102 and the phone. Similarly, the image capturing device 102, may include a tablet case/stand module to allow for integration between the image capturing device 102 and the tablet computers. In another example, the image capturing device 102 may include a selfie stick module. The selfie stick module can be made of rubber/plastic, which houses both the phone and the rest of the image capturing device 102. In some examples, the selfie stick module can be removed from the image capturing device 102. The selfie stick can serve as a regular selfie stick for the phone, while the image capturing device 102 is docked onto the selfie stick module, allowing mechanical integration between the apparatus and the phone.

Figure 30:
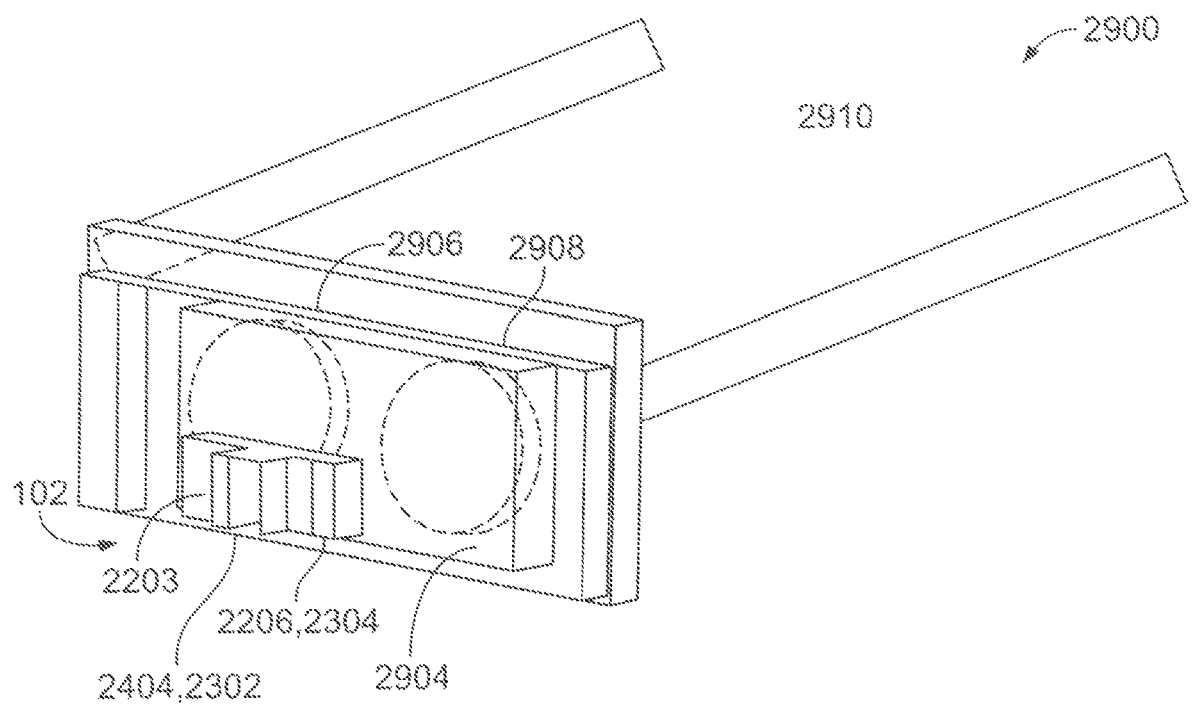
FIG. 30 is a block diagram of a perspective view of the example image capturing device of FIG. 29.

FIG. 30 is a block diagram of a perspective view of an example image capturing device 102. In some examples, the display device 2900 can provide a headset for virtual reality (VR) and/or augmented reality (AR), as described above. The first modality and second modality can be determined based on an implementation. For example, the first modality can provide color imaging and second modality can provide thermal imaging. In another example, the first modality can provide NIR imaging and second modality can provide thermal imaging, with a near-infrared light source integrated in the system.

In some examples, the image capturing device 102 is electrically connected to the mobile device 2904 in a wireless and/or wired fashion, e.g., via Bluetooth™, micro-USB, mini-USB, Apple™ lightning connector socket, or any other connector data socket on the phone or tablet computers. The display device 2900 can be constructed from rubber/plastics, cardboard, paper or metal, etc. which houses the mobile device 2904 and/or the image capturing device 102. The image capturing device 102 can be removed from the rest of the display module 2900. The display module 2900 can serve as a regular VR/AR enclosure for a phone. The image capturing device 102 can be docked onto the display module 2900, allowing for mechanical integration between the image capturing device 102 and the mobile device 2904 to provide display of VR and/or AR, e.g., via the display of the mobile device 2904. Coregistration and display logic can be executed on the image capturing device 102, on the mobile device 2904, on a server (cloud), and/or any combination thereof. In some examples, the image capturing device 102 does not include a built-in computing module 2208. Instead, the image capturing device 102 can use the computing unit of the mobile device 2904 (CPU, RAM, GPU, etc.) as its computing module. Therefore, the images of the first modality and second modality can be captured, registered and processed for display on the mobile device 2904 to provide VR and/or AR viewing.

In some aspects of the image capturing device 102, the first imaging modality data can be used to control the placement of the second imaging modality sensor using an actuator, so that the second imaging modality sensor captures an image correlated with a portion of image captured by the first modality sensor. In one example, the first modality is thermal imaging and the second modality is color imaging. The image capturing device 102 can include a sensor, e.g., of thermal imaging, with a larger field of view (FOV) relative to the other sensor(s), and a sensor, e.g., of color imaging, with a smaller field of view (FOV) than the other sensor(s). In some examples, the larger field of view is implemented with multiple sensors. In some examples, the larger/smaller filed of views are implemented with fixed and/or zoom lenses. In some examples, the large field of view is about 180 degrees or more and the smaller field of view is about 50 degrees or less. Other angles can be used for wide and/or narrow fields of view. While thermal and color imaging is used for the sake of explanation, any of the modalities and combinations thereof, e.g., as described herein, can be used with the larger and/or smaller field of views.

The image capturing device 102 can also include an actuator and a controller. In some examples, the image capturing device 102 can first capture an image using the image sensor of the first modality. Based on an image analysis result of the thermal imaging data (e.g. motion detection, or detection of high intensity, or object tracking), the logic can control a placement/aiming of the color image sensor using an actuator so that the color image sensor captures a correlated image containing the feature(s) of interest detected by thermal imaging (e.g. motions detected by thermal imaging, faces, human, animals, hot objects). In some aspect, the thermal imaging sensor has a larger FOV that includes a wide-angle lens, 360 degree lens or an omni-directional lens. Alternatively, more than one thermal image sensors can be used to provide a larger FOV (combination of FOV of multiple thermal sensors). The larger FOV color sensor can be used to control the placement of smaller FOV thermal sensor in a similar way. In another example, the first modality is LIDAR (light detection and ranging) with a larger FOV, and the second modality is thermal imaging with a smaller FOV. Based on the analysis of the LIDAR data (e.g. pedestrian detection, obstacle detection, vehicle detection, etc.), the placement/aiming of the thermal image sensor can be controlled so that the thermal image sensor captures a correlated image containing the feature(s) of interest detected by LIDAR (e.g. pedestrians, obstacles, vehicles, etc.). This example can be useful for self-driving and automatic brake systems. In another example, the first modality is thermal imaging with a larger FOV, and the second modality is NIR imaging with a smaller FOV. The imaging device 102 further includes an NIR light source (e.g. NIR LEDs). Based on the image analysis of the thermal imaging data (e.g. motion detection, or detection of high intensity, or object tracking), the placement/aiming of the NIR image sensor and NIR light source can be controlled using the actuator so that the NIR image sensor captures a correlated image containing the feature(s) of interest detected by thermal imaging (e.g. motions detected by thermal imaging, faces, human, animals, hot objects). This example can be useful for security monitoring purposes, etc.

In yet another example, the first modality is color imaging with larger FOV and the second modality is color imaging with smaller FOV. In some aspects, the color imaging sensor has a larger FOV (the first imaging modality) including a wide-angle lens, 360 degree lens or an omnidirectional lens. Alternatively, more than one color imaging sensors can be used to provide a larger FOV as the first imaging modality (combination of FOV of multiple color sensors). Based on the image analysis of the image data of the larger FOV color imaging (e.g. motion detection, face detection, object recognition, and/or object tracking, etc.), the placement/aiming of the smaller FOV color image sensor (second imaging modality) can be controlled using the actuator so that the smaller FOV color image sensor captures a correlated image containing the feature of interest detected by larger FOV color imaging (e.g. motions, faces, objects, feature tracking, etc.)

Figure 31:
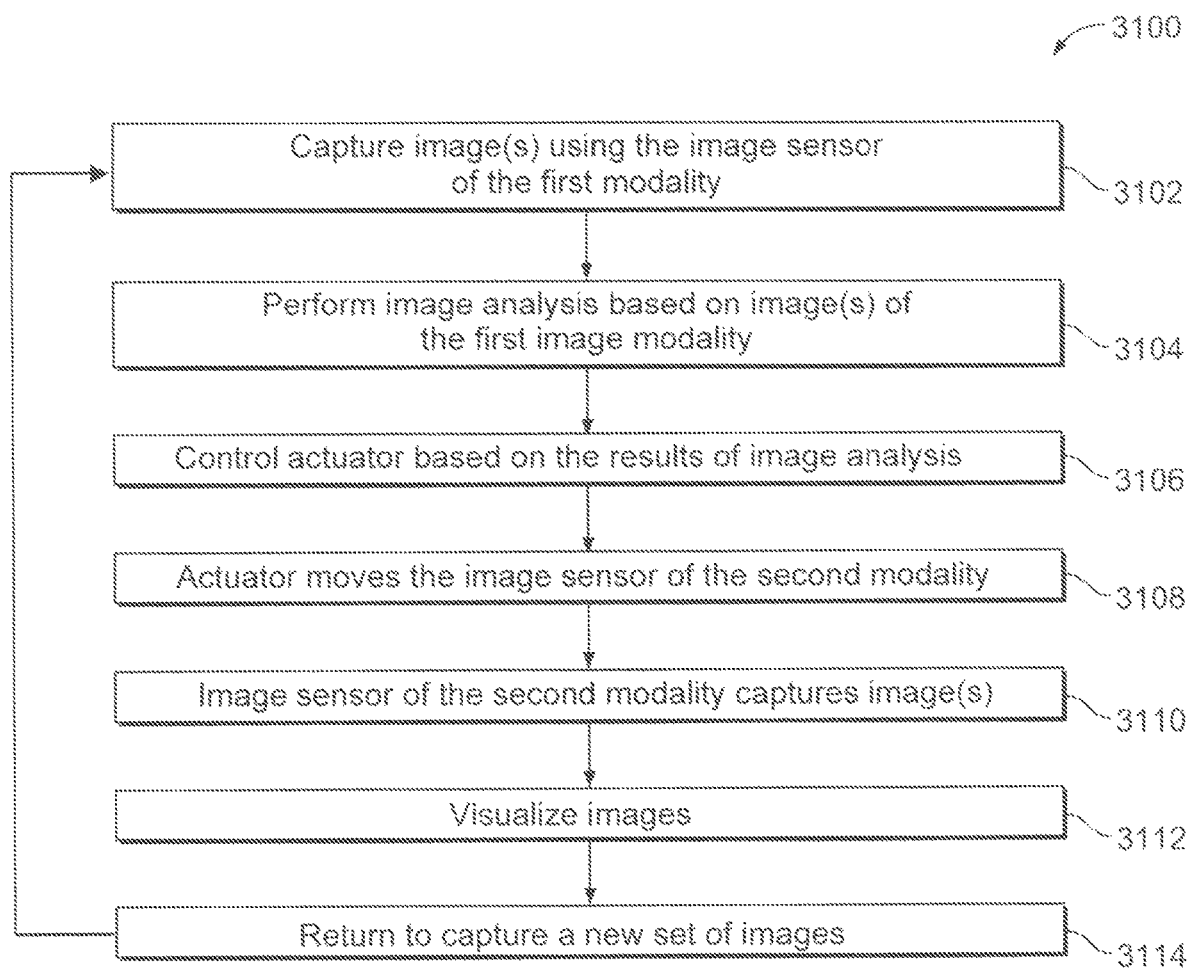
FIG. 31 is a flowchart of an example logic for controlling the placement/aiming of the image sensor of the second modality.

FIG. 31 is a flowchart 3100 of an example logic for controlling the placement/aiming of the image sensor of the second modality. At least once, the logic capture at least one image using the imaging sensor of the first image modality (3102). At least once, the logic can perform image analysis based on the image(s) of the first imaging modality (3104). The image analysis can be motion detection, face detection, high intensity detection, object recognition, pedestrian detection, obstacle detection, object tracking, or any other image analysis or computer vision algorithms. The logic subsequently controls the actuator based on the results of image analysis (3106). The actuator moves the image sensor of the second modality (3108). The image sensor of the second modality captures image(s) (3110). In some examples, the images can be visualized/displayed (3112).

In some examples, the image capturing device 102 can be used with mobile devices, e.g., smartphones and tablet computers, etc. The image capturing device 102 only includes one image sensor of the first modality, provide an interface to communicate with one or a plurality of image sensors of the second modality that are built in the smartphones and tablet computers (e.g. built-in phone cameras). In some examples, there is no built-in controller in the imaging device 102, and the mobile device's controller is used for controlling the imaging device 102. In some aspects, the image capturing device 102 may only include one larger FOV thermal image sensor (the first imaging modality) and an actuator, to guide placement/aiming of the color camera in the smartphone (the second imaging modality) using the said actuator. In another aspect, the image capturing device 102 may only include one larger FOV color image sensor (first imaging modality) and an actuator, to guide placement/aiming of the color camera in the smartphone (the second imaging modality) using the said actuator. The larger FOV color image sensor may include a fisheye lens, a wide angle lens, an omni-directional lens, a 360 degree lens, or a combination thereof.

While various embodiments have been described, it can be appreciated that many more embodiments and implementations are possible. Accordingly, the embodiments are not to be restricted.

We claim:

1. An image capturing device that captures images, comprising:
    a first sensor configured to capture a first image of a target in a first imaging modality;
    a second sensor configured to capture a second image of the target in the first imaging modality;
    a third sensor configured to capture a third image of the target in a second imaging modality; and
    a controller configured to:
        determine a z parameter for the first image and the second image based on each pixel captured in the first image in the first imaging modality to each pixel in the second image in the first imaging modality, wherein the z parameter is a difference in distance that a first imaging plane associated with the first sensor and a second imaging plane associated with the second sensor is from the target,
        calibrate the first image and/or the second image in the first imaging modality to the third image captured by the third sensor in the second imaging modality based on the z parameter, and
        register each pixel included in the first image and/or the second image in the first imaging modality to each corresponding pixel in the third image in the second imaging modality based on the calibration of the first image and/or the second image in the first imaging modality to the third image in the second imaging modality.

2. The image capturing device of claim 1, wherein the image registration is based on depth information calculated based on information from the first sensor and the second sensor.

3. The image capturing device of claim 1, wherein the first imaging modality comprises color imaging.

4. The image capturing device of claim 1, wherein the first imaging modality comprises near-infrared imaging.

5. The image capturing device of claim 1, wherein the second imaging modality comprises thermal imaging.

6. The image capturing device of claim 1, wherein the second imaging modality comprises at least of one of terahertz imaging, hyperspectral imaging, fluorescence imaging, narrow band imaging and oxygen saturation imaging.

7. The image capturing device of claim 1, further comprising a light source to illuminate a subject captured by at least one of the first sensor, the second sensor and the third sensor.

8. The image capturing device of claim 7, wherein the light source further comprises at least one light emitting diode.

9. The image capturing device of claim 1, further comprising at least one actuator connected with at least one of the first sensor, the second sensor and the third sensor, for adjusting a positon of at least one of the first sensor, the second sensor and the third sensor.

10. The image capturing device of claim 1, further comprising an unmanned aerial vehicle.

11. The image capturing device of claim 1, wherein the first sensor, the second sensor and the third sensor provide information to control a vehicle.

12. The image capturing device of claim 1, further comprising a display to display an output image of the registration.

13. The image capturing device of claim 1, wherein the first sensor, the second sensor and the third sensor are housed in at least one of a robot, a motor vehicle, a toy, a baby monitor and a head-mounted display.

14. The image capturing device of claim 1, further comprising a commutation interface to remotely communicate data from the first sensor, the second sensor and the third sensor.

15. The image capturing device of claim 1, where the third sensor having the second imaging modality is positioned between or on top of the first sensor and the second sensor having the first imaging modality.

16. The image capturing device of claim 1, further comprising a filter positioned in front of at least one of the first sensor, the second sensor and the third sensor and a subject.

17. An image capturing device for use with a device having a controller and a communication interface, comprising:
a first sensor configured to capture a first image of a target in a first imaging modality;
a second sensor configured to capture a second image of the target in the first imaging modality;
a third sensor configured to capture a third image of the target in a second imaging modality;
a controller configured to:
determine a z parameter for the first image and the second image based on each pixel captured in the first image in the first imaging modality to each pixel in the second image in the first imaging modality, wherein the z parameter is a difference in distance that a first imaging plane associated with the first sensor and a second imaging plane associated with the second sensor is from the target,
calibrate the first image and/or the second image in the first imaging modality to the third image captured by the third sensor in the second imaging modality based on the z parameter, and
register each pixel included in the first image and/or the second image in the first imaging modality to each corresponding pixel in the third image in the second imaging modality based on the calibration of the first image and/or the second image in the first imaging modality to the third image in the second imaging modality; and
a communication interface configured to send the first image captured by the first sensor and/or the second image captured by the second sensor, and the third image captured by the third sensor, to the controller of the device.

18. The image capturing device of claim 17, wherein the registration is based on depth information calculated based on the first sensor and the second sensor.

19. The image capturing device of claim 17, wherein the first imaging modality comprises color imaging.

20. The image capturing device of claim 17, wherein the first imaging modality comprises near-infrared imaging.

21. The image capturing device of claim 17, wherein the second imaging modality comprises thermal imaging.

22. The image capturing device of claim 17, wherein the second imaging modality comprises at least of one of terahertz imaging, hyperspectral imaging, fluorescence imaging, narrow band imaging and oxygen saturation imaging.

23. The image capturing device of claim 17, further comprising a light source to illuminate a subject captured by at least one of the first sensor, the second sensor and the third sensor.

24. The image capturing device of claim 23, wherein the light source further comprises at least one light emitting diode.

25. The image capturing device of claim 17, further comprising at least one actuator connected with at least one of the first sensor, the second sensor and the third sensor, for adjusting a positon of at least one of the first sensor, the second sensor and the third sensor.

26. The image capturing device of claim 17, further comprising an unmanned aerial vehicle.

27. The image capturing device of claim 17, further comprising a display to display an output image of the registration.

28. The image capturing device of claim 17, wherein the first sensor, the second sensor and the third sensor are housed in at least one of a robot, a vehicle, a toy, a baby monitor and a head-mounted display.

29. The image capturing device of claim 17, where the third sensor having the second imaging modality is positioned between or on top of the first sensor and the second sensor having the first imaging modality.

30. The image capturing device of claim 17, further comprising a filter positioned in front of at least one of the first sensor, the second sensor and the third sensor and a subject.

31. A method of registering images of a first imaging modality to images of a second imaging modality, comprising:
capturing a first image of a target using a first sensor that includes the first imaging modality;
capturing a second image of the target using a second sensor that includes the first imaging modality;
capturing a third image of the target using a third sensor that includes the second imaging modality;
determining a first depth map for each pixel included in the first image and the second image in the first imaging modality, wherein the first depth map is a difference in distance that a first imaging plane associated with the first sensor and a second imaging plane associated with the second sensor is from the target;
calibrating the first image and/or the second image in the first imaging modality to the third image captured by the third sensor in the second imaging modality based on the first depth map; and
registering each pixel included in the first image and/or the second image in the first imaging modality to each corresponding pixel in the third image in the second imaging modality based on the calibration of the first image and/or the second image in the first imaging modality to the third image in the second imaging modality.

32. The method of claim 31, further comprising displaying a composite image of the first image registered to the third image.

33. The method of claim 31, wherein the first imaging modality comprises color imaging.

34. The method of claim 31, wherein the first imaging modality comprises near-infrared imaging.

35. The method of claim 31, wherein the second imaging modality comprises at least of one of thermal imaging, terahertz imaging, hyperspectral imaging, fluorescence imaging, narrow band imaging and oxygen saturation imaging.

36. The method of claim 31, further comprising:
calculating a second depth map for at least one pixel of the second image based on the first image and the second image; and
registering the second image to the third image based on the second depth map.

37. The method of claim 36, further comprising:
displaying a first composite image of the first image registered to the third image to a first eye of a user; and
displaying a second composite image of the second image registered to the third image to a second eye of the user.

38. An image capturing device that captures images, comprising:

a first sensor configured to capture a first image of a target in a first imaging modality;

a second sensor configured to capture a second image of the target in the first imaging modality;

an actuator; and a controller connected with the first sensor, the second sensor and the actuator, and configured to:

determine a z parameter for the first image and the second image based on each pixel captured in the first image in the first imaging modality to each pixel in the second image in the first imaging modality, wherein the z parameter is a difference in distance that a first imaging plane associated with the first sensor and a second imaging plane associated with the second sensor is from the target, calibrate the first image and/or the second image in the first imaging modality to a third image captured by a third sensor in a second imaging modality based on the z parameter, register each pixel included in the first image and/or second image in the first imaging modality to each corresponding pixel in the third image in the second imaging modality based on the calibration of the first image and/or the second image in the first imaging modality to the third image in the second imaging modality, and adjust the position of the actuator to the requested position to capture the second image by the second sensor in response to a request from the first sensor.

39. The image capturing device of claim 38, wherein the first sensor further comprises at least one of an omnidirectional lens, a 360 degree lens, a fisheye lens, an wide-angle lens and a convex mirror.

40. The image capturing device of claim 38, wherein the first sensor further comprises a thermal image sensor.

41. The image capturing device of claim 38, wherein the first sensor further comprises a color image sensor having a large field of view and the second sensor further comprises a color image sensor having a small field of view.

42. The image capturing device of claim 38, wherein information from the first sensor and the second sensor control at least one of a wheel, an unmanned aerial vehicle, a display, a robot, a toy, a baby monitor and a head-mounted display.

43. An image capturing device for use with a device having an image sensor including a second imaging modality, a controller and a communication interface, comprising:

a first sensor configured to capture a first image of a target in a first imaging modality;

a second sensor configured to capture a second image of the target in the first imaging modality, a third sensor configured to capture a third image of the target in the second imaging modality, an actuator, the actuator mechanically coupled to the device;

a controller configured to:

determine a z parameter for the first image and the second image based on each pixel captured in the first image in the first imaging modality to each pixel in the second image in the first imaging modality, wherein the z parameter is a difference in distance that a first imaging plane associated with the first sensor and a second imaging plane associated with the second sensor is from the target, calibrate the first image and/or the second image in the first imaging modality to the third image captured by the third sensor in the second imaging modality based on the z parameter, register each pixel included in the first image and/or the second image in the first imaging modality to each corresponding pixel in the third image in the second imaging modality based on the calibration of the first image and/or the second image in the first imaging modality to the third image in the second imaging modality, and adjust a portion of the actuator to a requested position to capture the second image by the second sensor in response to a request from the first sensor; and a communication interface configured to send the first image captured by the first sensor to the controller of the device.

44. The image capturing device of claim 43, wherein the first sensor further comprises at least one of an omnidirectional lens, a 360 lens, a fisheye lens, a wide-angle lens and a convex mirror.

45. The image capturing device of claim 43, wherein the first sensor further comprises a thermal image sensor.

46. The image capturing device of claim 43, wherein the first sensor further comprises a color image sensor having a large field of view and the second sensor further comprises a color image sensor having a small field of view.

47. The image capturing device of claim 43, wherein information from the first sensor and the second sensor control at least one of a wheel, an unmanned aerial vehicle, a display, a robot, a toy, a baby monitor and a head-mounted display.

* * * * *